US011755275B2

(12) United States Patent
Lovitt

(10) Patent No.: US 11,755,275 B2
(45) Date of Patent: Sep. 12, 2023

(54) GENERATING AUGMENTED REALITY EXPERIENCES UTILIZING PHYSICAL OBJECTS TO REPRESENT ANALOGOUS VIRTUAL OBJECTS

(71) Applicant: Meta Platforms Technologies, LLC, Menlo Park, CA (US)

(72) Inventor: Andrew Lovitt, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 25 days.

(21) Appl. No.: 16/915,684

(22) Filed: Jun. 29, 2020

(65) Prior Publication Data

US 2021/0405959 A1    Dec. 30, 2021

(51) Int. Cl.
*G06T 11/00* (2006.01)
*G06F 3/16* (2006.01)

(52) U.S. Cl.
CPC ............. *G06F 3/165* (2013.01); *G06T 11/00* (2013.01)

(58) Field of Classification Search
CPC ................................. G06F 3/165; G06T 11/00
USPC ......................................................... 345/633
See application file for complete search history.

(56) References Cited

U.S. PATENT DOCUMENTS

| | | | | |
|---|---|---|---|---|
| 10,237,675 | B1 * | 3/2019 | Valavanis | H04S 7/304 |
| 2005/0249367 | A1 * | 11/2005 | Bailey | H04S 3/008 |
| | | | | 381/310 |
| 2012/0206452 | A1 * | 8/2012 | Geisner | H04S 7/304 |
| | | | | 345/419 |
| 2013/0041648 | A1 * | 2/2013 | Osman | H04S 7/302 |
| | | | | 381/300 |
| 2014/0233917 | A1 * | 8/2014 | Xiang | H04S 7/30 |
| | | | | 386/285 |
| 2014/0328505 | A1 * | 11/2014 | Heinemann | G06F 3/017 |
| | | | | 381/303 |
| 2018/0284955 | A1 * | 10/2018 | Canavor | G06F 16/29 |
| 2018/0324539 | A1 * | 11/2018 | Lovitt | G02B 27/017 |
| 2019/0278204 | A1 * | 9/2019 | Nanjo | G03G 15/2064 |
| 2019/0304191 | A1 * | 10/2019 | Hsu | G06F 3/03 |
| 2020/0005544 | A1 * | 1/2020 | Kim | G06T 7/75 |
| 2021/0195360 | A1 * | 6/2021 | Leider | G06T 19/006 |

* cited by examiner

*Primary Examiner* — Jin Ge
(74) *Attorney, Agent, or Firm* — Keller Preece PLLC

(57) ABSTRACT

This disclosure describes embodiments of methods, non-transitory computer-readable media, and systems for detecting that a physical space includes a physical object corresponding to an analogous virtual object from an augmented reality experience and rendering (or otherwise modifying) the augment reality experience to integrate the physical object as part of the experience. In particular, the disclosed systems can determine that a physical object within a physical environment corresponds to an analogous virtual object of an augmented reality experience. Based on this correspondence, the disclosed systems can modify one or more of the virtual graphics, sound, or other features corresponding to the augmented reality experience to represent the virtual object using the physical object. For example, the disclosed systems can modify acoustic features of a sound for the augmented reality experience to simulate the sound originating from (or being affected by) the physical object.

20 Claims, 13 Drawing Sheets

GENERATING AUGMENTED REALITY EXPERIENCES UTILIZING PHYSICAL OBJECTS TO REPRESENT ANALOGOUS VIRTUAL OBJECTS

BACKGROUND

In recent years, augmented reality systems have significantly improved the realism and detail of virtual imagery. For example, existing augmented reality systems can generate colorful and interactive augmented reality experiences that overlay virtual objects over real physical environments. In some cases, an existing augmented reality system can generate an interactive augmented reality experience for a game or simulation, where the experience includes virtual objects positioned at specific locations within a physical space. A user of an augmented-reality-computing device can view and interact with such virtual objects as part of the game or simulation.

Although conventional augmented reality systems can generate engaging and realistic augmented reality experiences, such systems often consume excessive computer processing, memory, or other computing resources to produce the realism and detail of today's augmented reality experiences. To generate a single frame of a virtual experience, for instance, some existing augmented reality systems consume much of the processing power of a Graphics Processing Unit ("GPU") to render the frame with high resolutions of 1920 by 1080 pixels (or greater). Because a GPU often processes at speeds slower than a general Central Processing Unit ("CPU"), some existing augmented reality systems lack the processing power to render realistic virtual objects or entire augmented-reality experiences in real (or near-real) time.

In addition to consuming significant processing power, some existing augmented reality systems inefficiently transfer memory between main memory (e.g., host memory) and GPU dedicated memory (e.g., device memory). For example, because GPUs generally operate at a much lower clock speed than a CPU in existing augmented reality systems, transfers between host memory and device memory often have limited bandwidth and high latency. This performance bottleneck results in poorly optimized GPU-acceleration applications, such as when existing augmented reality systems generate augmented reality experiences.

Such processing speeds and memory transfers become even more difficult when existing augmented reality systems use a head-mounted device, a mobile computing device, or other smaller computing devices to render augmented reality experiences. Because computing devices require such processing and memory to extemporaneously render augmented reality, some augmented reality systems execute programs designed to produce lower resolution and less realistic virtual objects.

Beyond the computing-resource demands of virtual graphics, some existing augmented reality systems consume significant computing resources by incorporating sound into augmented reality experiences. For example, existing augmented reality systems utilize excessive processing and memory in altering sounds to simulate those sounds coming from virtual objects in an augmented reality experience. In comparison to complex sounds produced by physical objects (e.g., the complex sound of a car engine that includes multiple sound components), existing augmented reality systems consume increased computing resources in attempting to simulated complex sounds coming from a virtual object. For example, some existing systems waste significant computing resources in generating multiple audio streams corresponding to the complex sound and then altering each audio stream to simulate origination from a virtual object—all to complete the illusion that the virtual object is creating the complex sound in the same way that a similar physical object would create the same sound.

As suggested by the computing-resource demands described above, by rigidly rendering virtual object after virtual object—frame after frame—existing augmented reality systems can consume loads of processing power and memory for augmented reality experiences in common physical environments. In some cases, augmented reality systems perform the same algorithms and computer processing to map a physical space and render the same virtual objects—even when a computing device has previously encountered the physical space and its constituent physical objects. Despite one computing device or another computing device mapping a common physical object or rendering common virtual objects, some conventional augmented reality systems often operate in isolation and do not save previously three-dimensional mappings or share such mappings or other calculations with other computing devices that may share the same physical space or virtual objects.

SUMMARY

This disclosure describes one or more embodiments of methods, non-transitory computer-readable media, and systems that solve the foregoing problems or provide other benefits. For instance, the disclosed systems can detect that a physical space includes a physical object corresponding to an analogous virtual object from an augmented reality experience and present the augment reality experience by anchoring or changing a sound—or modifying graphics—for the augmented reality experience to simulate the physical object as part of the experience. In particular, the disclosed systems can determine that a physical object within a physical environment corresponds to an analogous virtual object of an augmented reality experience. Based on this correspondence, the disclosed systems can modify one or more of the virtual graphics, sound, or other features corresponding to the augmented reality experience to represent the virtual object using the physical object. To integrate the physical object into the augmented reality experience, the disclosed systems can modify acoustic features of a sound for the augmented reality experience to simulate the sound originating from (or being affected by) the physical object. Additionally or alternatively, the disclosed systems can modify or omit virtual graphics to depict the physical object as part of the augmented reality experience and extemporaneously modify the augmented reality experience based on user interactions with the physical object or corresponding virtual graphic.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
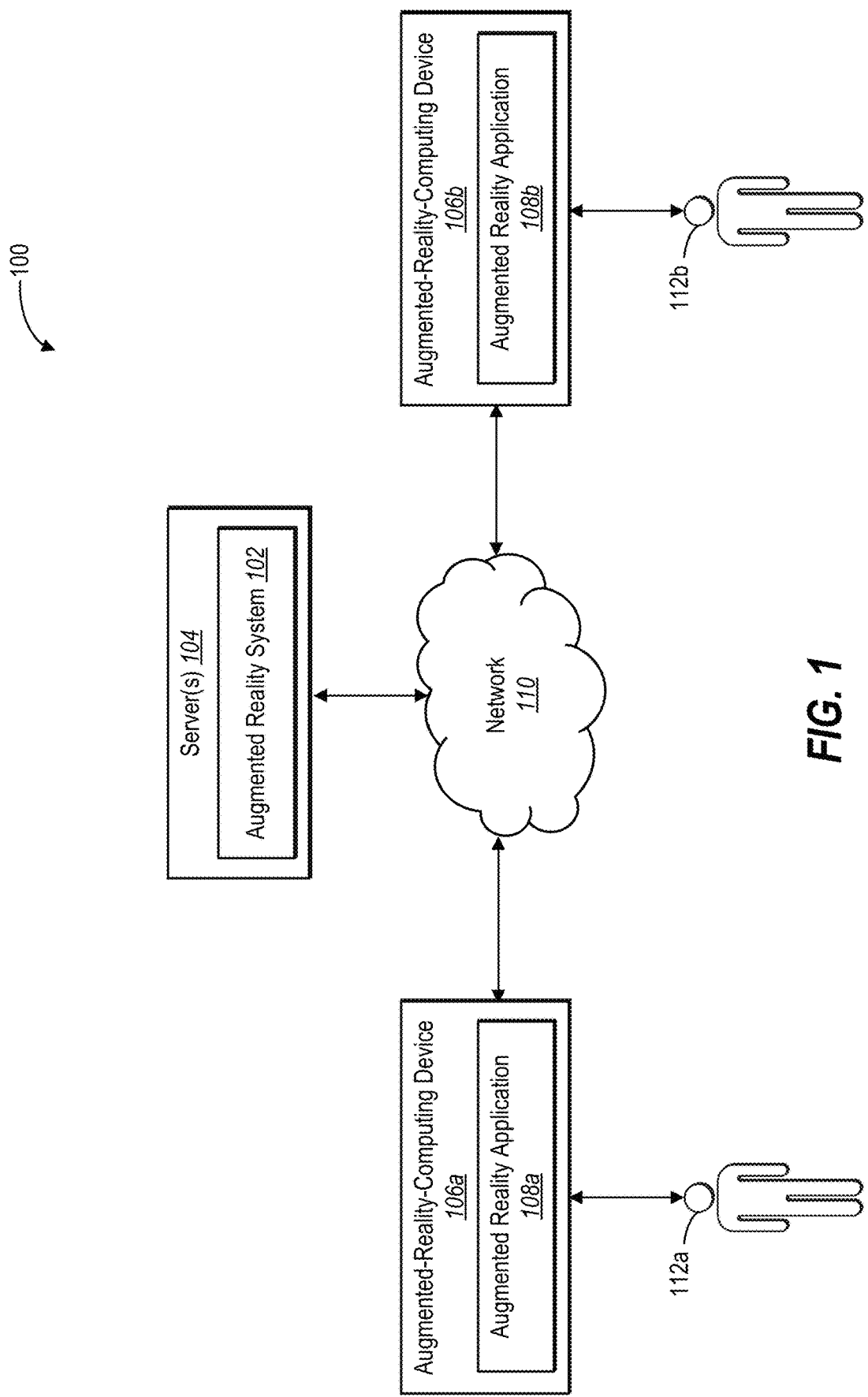
FIG. 1 illustrates an example environment in which an augmented reality system can operate in accordance with one or more embodiments.

This disclosure describes one or more embodiments of an augmented reality system that detects a physical object from a physical environment corresponds to an analogous virtual object from an augmented reality experience and presents the augment reality experience by anchoring or changing a sound for the augmented reality experience—or modifying or removing graphics representing the analogous virtual object for the augmented reality experience—to integrate the physical object into the augmented reality experience. For example, the augmented reality system can anchor acoustic features (or other features) of a sound for the augmented reality experience to a physical object corresponding to an analogous virtual object from the augmented reality experience. The augmented reality system can further generate or modify graphical features of virtual objects to simulate the physical object as an interactive part of the augmented reality experience. By anchoring or changing a sound to integrate a physical object into an augmented reality experience without (or instead of) an analogous virtual object, the augmented reality system efficiently renders graphics or generates sound for the augmented reality experience—thereby reducing the computer processing and other computing resources for conventionally rendering such an experience.

In some embodiments, for example, the augmented reality system captures a data stream corresponding to a physical environment utilizing an augmented-reality-computing device, such as a head-mounted-display device, a smart phone, or a smart tablet. By analyzing the captured data stream, the augmented reality system determines that a physical object in the physical environment corresponds to an analogous virtual object of an augmented reality experience. The augmented reality system can then signal or otherwise trigger the augmented-reality-computing device to present the augmented reality experience without utilizing the analogous virtual object. In some cases, for instance, the augmented-reality-computing device renders an augmented reality scene for display utilizing the physical object instead of the analogous virtual object. While presenting the augmented reality experience, the augmented reality system can modify acoustic features of a sound for the augmented reality experience to simulate either the sound originating from the physical object or an effect on the sound by the physical object. Additionally, or alternatively, the augmented reality system can modify or remove virtual graphics representing (or part of) the analogous virtual object for the augmented reality experience to integrate the physical object into the augmented reality experience.

To further illustrate, the augmented reality system can capture a data stream, corresponding to a physical environment, such as an image data, audio data, or data capture by environmental sensors. The augmented reality system can further map the physical environment relative to the augmented-reality-computing device to identify candidate physical objects within the physical environment. For example, the augmented reality system can map the physical environment to determine spatial relationships between features and objects of the physical environment (e.g., walls, furniture, windows, books, toys) and the augmented-reality-computing device. The augmented reality system can further recognize and analyze the physical objects within the physical environment to determine object types, object classifications, object features, and/or object characteristics.

In one or more embodiments, the augmented reality system further determines physical objects detected within a physical environment are analogous to virtual objects within a corresponding augmented reality experience. The physical object need not be identical to an analogous virtual object but share common visual characteristics. For example, the augmented reality system can analyze virtual objects within (or as part of) the augmented reality experience to determine types, classifications, features, and characteristics of the virtual objects. The physical object may also share functional characteristics with an analogous virtual object. For example, the augmented reality system can analyze virtual objects within the augmented reality experience to determine a function of one or more virtual objects. In some cases, the augmented reality system determines a physical object displays one or more images or produces audio as a function corresponding to an analogous virtual object. To illustrate, the augmented reality system can determine that (i) a function of a physical stereo system is to produce music or other auditory sounds similar to a virtual stereo system or that (ii) a function of a physical television or display screen is to display images similar to a virtual display screen.

In at least one embodiment, the augmented reality system can further identify analogous virtual objects by determining threshold matches between the types, classifications, features, functions, and characteristics of the physical objects and the virtual objects. For instance, the augmented reality system can determine a physical object matches an analogous virtual object based on an object-matching score or other appropriate techniques.

Upon detecting a physical object corresponds to an analogous virtual object from an augmented reality experience, the augmented reality system can present the augmented reality experience without some or all of the analogous virtual object. For example, the augmented reality system can generate, render, or otherwise present the augmented reality experience without utilizing the analogous virtual object. In some cases, the augmented reality system can render the augmented reality experience utilizing the physical object instead of the analogous virtual object. In some embodiments, the augmented reality system renders a portion of the analogous virtual object as an overlay on the corresponding physical object.

In addition to presenting an augmented reality experience without utilizing the analogous virtual object and instead utilizing a detected physical object, the augmented reality system can further anchor acoustic features of a sound or graphical features for the augmented reality experience to the physical object. For example, the augmented reality system can anchor or change acoustic features of a sound for the augmented reality experience to the physical object to simulate either the sound originating from the physical object or an effect on the sound by the physical object. To illustrate, the augmented reality system can anchor acoustic features of music for an augmented reality experience to a physical speaker identified in a physical environment. In one or more embodiments, the augmented reality system anchors acoustic or graphical features of the augmented reality experience by associating a location of the physical object with the anchored acoustic or graphical feature, such that any display, playback, or presentation associated with that feature within the augmented reality experience appears to originate from (or be affected by) the location and other characteristics of the physical object.

As indicated above, in certain implementations, the augmented reality system modifies acoustic features of a sound for an augmented reality experience to simulate either the sound originating from a physical object or an effect on the sound by the physical object. For example, the augmented reality system can modify acoustic features of the sound based on a distance and angle between the location of the physical object to which the sound is anchored and the augmented-reality-computing device. The augmented reality system can additionally modify acoustic features of the sound based on spectral localization cues that inform how the user understands the location of the sound, as well as on visual characteristics of the anchored physical object that may affect how the sound is heard (e.g., the size of the physical object, the direction that the physical object is pointing). In at least one embodiment, the augmented reality system can simulate sounds to be affected by a physical property of the physical object, such as with a sound that is altered to simulate that the sound originates outside of a window within the physical environment.

To further or otherwise enhance the augmented reality experience, the augmented reality system can modify graphical features of the augmented reality experience corresponding to the physical object for display within the physical environment. For example, the augmented reality system can generate a full or partial overlay for the physical object based on the analogous virtual object. In some cases, the augmented reality system generates a graphical overlay appearing similar to the analogous virtual object to modify the appearance of the physical object to simulate the analogous virtual object. The augmented reality system can further position the graphical overlay at the location of the physical object within the augmented reality experience. By positioning the graphical overlay in this manner, the augmented reality system can partially or completely obscure the underlying physical object, such as by giving a physical book a new virtual cover.

In one or more embodiments, the augmented reality system can also track user motions and interactions with (or in relation to) a physical object within an augmented reality experience. For example, the augmented reality system can track user interactions with a physical input device (e.g., the user typing on a physical keyboard) to generate new virtual objects in the augmented reality experience (e.g., a virtual graphic overlay on a computer screen that includes text corresponding to the tracked typing). In another example, the augmented reality system can track user interactions with a physical input device (e.g., a user pushing buttons on a physical game controller) to affect existing virtual objects in the augmented reality experience (e.g., virtual game characters from a virtual video game).

In at least one embodiment, the augmented reality system can further detect augmented-reality-computing devices in a shared augmented reality experience within a common physical environment. For example, the augmented reality system can detect that two separate augmented-reality-computing devices are generating the same set of augmented reality experiences within a common physical environment. In response, the augmented reality system can integrate the augmented reality experience for both devices in order for those devices to share information. Thus, the users of those augmented-reality-computing devices can cooperatively work through the same augmented reality experience within the common physical environment.

As mentioned above, the augmented reality system provides many technical advantages and benefits over conventional augmented reality systems and methods. For example, the augmented reality system improves the efficiency with which conventional augmented reality systems render and present augmented reality experiences. In comparison to conventional systems, the disclosed augmented reality system more efficiently uses and extends computing resources by selectively rendering or omitting certain virtual objects from an augmented reality experience and integrating an analogous physical object from a physical environment instead of such virtual objects. The disclosed augmented reality system can further extend computing resources by presenting or rendering only portions of a virtual object that differ from an analogous physical object—thereby avoiding the additional computing resources needed to render a full virtual object. The disclosed augmented reality system can accordingly use a physical object in conjunction with virtual objects to create a more realistic augmented-reality experience. By modifying and generating fewer graphical features for a virtual object of an augmented reality experience based on integrating an analogous physical object, for instance, the augmented reality system saves the computer processing power and transitory memory that would have conventionally been used by existing augmented-reality-display devices to render virtual objects for the same or similar augmented reality experiences. In some cases, the augmented reality system further saves memory storage that would have been utilized in storing (or transferring memory for) three-dimensional models or other information associated with the virtual objects once rendered.

In addition to more efficient virtual renderings, in some cases, the augmented reality system improves the efficiency with which systems generate or modify sounds for augmented reality. For example, the augmented reality system can save computer processing resources by consolidating one or more audio streams of a complex sound that is anchored to a physical object and then modify the consolidated audio streams. As explained further below, in one or more embodiments, the augmented reality system generates these efficiencies in consolidating or modifying audio streams (and other acoustic sound features) by leveraging the way the human auditory system understands and interpolates sound, such that a user of the augmented reality system notices no decrease in sound quality despite sound modifications that save computer processing and memory.

Moreover, the augmented reality system avoids the rigid requirements of augmented reality experiences that are typically imposed on conventional systems. For example, augmented reality experiences are generally non-scalable. In some instances, conventional systems require rendering all virtual objects within an augmented reality scene regardless of the physical environment over which the augmented reality scene or other augmented reality experience is overlaid and the functionality of an augmented-reality-computing device. The augmented reality system overcomes this rigidity by generating augmented reality experiences that are scalable based on the contents of the current physical environment.

For example, an augmented reality experience may include a specific type of virtual speaker corresponding to music for the experience. By anchoring and modifying sound to a physical speaker from a physical environment rather than to the virtual speaker, the augmented reality system can scale down the sound quality or other characteristics for the augmented reality experience. Similarly, the augmented reality system can scale down rendering virtual objects based on the physical objects detected in a physical environment. The augmented reality system can further utilize more or fewer physical objects within a physical environment depending on the processing and memory capabilities of a given augmented-reality-computing device. Thus, the augmented reality system is more flexible than conventional systems because it can adjust an augmented reality experience to include or exclude virtual objects (or modify sounds) based on the physical objects currently available and computing device capabilities.

As illustrated by the foregoing discussion, the present disclosure utilizes a variety of terms to describe features and advantages of the augmented reality system. Additional detail is now provided regarding the meaning of such terms. For example, as used herein, "augmented reality" refers to a composite view including computer-generated elements real-world or physical elements from a physical environment. For instance, in one or more embodiments, the augmented reality system generates an augmented reality experience including one or more virtual objects and positions the virtual objects over the user's view within an augmented-reality-computing device. In one or more embodiments, the augmented reality system presents and/or renders an augmented reality experience utilizing a particular physical object instead of an analogous virtual object. Additionally, in at least one embodiment, the augmented reality system presents an augmented reality experience by superimposing a virtual graphic overlay over a portion of a particular physical object or over the entire particular physical object.

As used herein, an "augmented-reality-computing device" refers to a computing device that generates and presents an augmented reality experience. For example, an augmented-reality-computing device can generate, render, and/or present a display of an augmented reality experience comprising one or more virtual objects and physical objects. Additionally or alternatively, an augmented-reality-computing device can generate and/or present an audio-only augmented reality experience without virtual objects as visual components, but rather generate or present one or more virtual sounds. An augmented-reality-computing device can be a head-mounted-computing device, such as a virtual reality headset, mixed reality headset, augmented reality glasses, smart glasses, and/or a head-embedded computing device. In some cases, other computing devices can also function as augmented-reality-computing devices, such as smart phones and/or smart tables (e.g., with rear-facing cameras). In at least one embodiment, an augmented-reality-computing device also includes audio playback features (e.g., headphones, ear buds) that provide audio associated with an augmented reality experience to the user wearing the device. An augmented-reality-computing device can further include various environmental sensors (e.g., a gyroscope, an accelerometer) to enable movement detection.

As further used herein, an "augmented reality experience" refers to one or more augmented reality graphics, sounds, or other features generated or provided via an augmented-reality-computing device. Such features can be part of a game experience, an educational experience, a business experience, an entertainment experience, or similar. In one or more embodiments, an augmented reality experience includes one or more augmented reality scenes, each including virtual objects and/or sounds associated with each augmented reality scene. Accordingly, as described below, this disclosure's references to augmented reality experience may comprise or constitute an augmented reality scene with one or more virtual objects. By contrast, in some cases, an augmented reality experience includes generating or presenting one or more virtual sounds without rendering or otherwise presenting virtual objects.

As just indicated, an augmented reality experience can include an augmented reality scene. An "augmented reality scene" refers to a composite image or view comprising one or more virtual objects and physical (or real-world) objects. In some cases, an augmented reality scene comprises a three-dimensional image or environment comprising both a virtual object and a physical object with which a user can interact using computer detection or environmental sensors. In one or more embodiments, an augmented reality scene further includes or corresponds to one or more sounds that further inform or enhance the augmented reality scene. For example, a sound for an augmented reality scene can include music, sound effects, human speech, and any other type of sound.

As used herein, a "virtual object" refers to a computer-generated-graphical object rendered as part of an augmented reality scene or other augmented reality experience. For example, a virtual object may include an object generated by a computing device for display within an augmented reality scene or for use within an augmented reality application. Such virtual objects may be, but are not limited to, virtual accessories, animals, books, electronic devices, vehicles, windows, or any other graphical object created by a computer. A virtual object can have features, characteristics, and other qualities (e.g., as defined by a model, a file, a database).

As used herein, an "analogous virtual object" is a virtual object for an augmented reality experience that is determined to be an analog of a corresponding physical object in a physical environment. For example, an analogous virtual object may or may not be identical to a corresponding physical object. In at least one embodiment, an analogous virtual object shares at least one feature and/or characteristic of a corresponding physical object.

In one or more embodiments, the augmented reality system can modify acoustic features based on spectral localization cues. As discussed below, "spectral localization cues" refer cues that inform or stimulate how the human brain localizes sound outside of the human head. Spectral localization cues are generally individual to a user and include how the user's head and the intricacies of his or her ears effect the frequencies that eventually reach the user's ear drums. For example, due to the complexities of the human ear (e.g., the shape of the outer ear with its concave and asymmetrical folds), a person may only hear a subset of the spectrum of frequencies within a single sound. A different user may hear a different subset of spectrum of frequencies within the same sound because of physical differences in his or her ears. The way that the person hears and locates sound is further affected by the size and shape of his or her head, which sound must travel around to reach both ears. In at least one embodiment, the augmented reality system utilizes average spectral localization cues (e.g., based on an average ear and head size) to modify the originating location of a sound.

As used herein, a "physical environment" refers to a physical space surrounding or within proximity to a user detected in whole or in party by an augmented-reality-computing device. In some embodiments, a physical environment includes physical objects located in a physical space detected by a camera, microphone, or other sensor of an augmented-reality-computing device. A physical environment can be indoors (e.g., a bedroom, and office, a classroom) or outdoors (e.g., a park, a beach, a playground, a shopping mall). A physical environment can include area indicators (e.g., a floor, walls, a ceiling), which define the area or confines of the physical environment, and physical objects, which reside within the defined area or confines of the physical environment.

As used herein, a "physical object" refers to a real-world article in a physical area. Such physical objects may be, but are not limited to, physical accessories, animals, books, electronic devices, vehicles, windows, or any other tangible or physical object in the real world. In some cases, physical objects may be free-standing or may be positioned on other physical objects (e.g., as a lamp may be positioned on desk). Physical objects can have classifications, types, features, and characteristics, as discussed below.

As used herein, "acoustic features" refers to sound components present in (or detected from) a sound. For example, acoustic features of a sound may include an amplitude for the sound, one or more frequencies that make up the sound, the volume of the sound, timbre of the sound, the reverberation of the sound, or the color or loudness of the sound. In at least one embodiment, acoustic features of a complex sound may include two or more audio streams that represent sub-sounds within the complex sound.

As used herein, a "sound profile" refers to acoustic instructions associated with a virtual object or other object. For example, a sound profile associated with a virtual object can inform how sounds originating from the virtual object should sound. As such, the virtual object's sound profile may include various acoustic features, such as a sound volume, a level of sound degradation, a level of sound enhancement, and various level specifications (e.g., associated with treble levels, bass levels).

As used herein, a "data stream" refers to a sequence of data captured by an augmented-reality-computing device. In one or more embodiments, a data stream can include an image stream captured by a camera or other image-capturing device, an audio stream captured by a microphone or other audio input, or a data stream captured by one or more environmental sensors associated with the augmented-reality-computing device. For example, a data stream may include optical data captured by an optical sensor or laser data captured by a laser scanner. In either case, the data stream may be captured as part of a simultaneous location and mapping ("SLAM"). As a further example, an environmental data stream from a gyroscope of an augmented-reality-computing device can include a stream of data indicating a real-time tilt and orientation associated with the augmented-reality-computing device. A data stream may be continuous or intermittent or have a starting point or capture and ending point of capture. For example, an augmented-reality-computing device may capture one or more intermittent sequences of data in response to detecting movement (e.g., while the user is moving his or her head), and then return to a passive mode where data sequences are no longer captured. Alternatively, an augmented-reality-computing device can capture one or more data streams continuously.

As noted above, a data stream may include an image stream or an audio stream. As used herein, an "image stream" refers to a sequence of images captured by (or received from) a camera or other image-capturing device. In some case, an image stream includes a sequence of still images captured by a camera divide (e.g., a micro-camera associated with an augmented-reality-computing device). In at least one embodiment, an image stream can be provided by a camera in real time or near-real time. Additionally, as used herein, an "audio stream" refers to a sequence of data comprising audio information. In some cases, an audio stream includes a sequence of data captured by a microphone that a computing device encodes or transforms into data packets comprising audio information (e.g., acoustic tones and/or frequencies).

FIG. 1 illustrates an example block diagram of an environment 100 for implementing an augmented reality system 102. As illustrated in FIG. 1, the augmented reality system 102 includes augmented-reality-computing devices 106a and 106b, and server(s) 104, which are communicatively coupled through a network 110. As shown in FIG. 1, the augmented-reality-computing devices 106a and 106b include augmented reality applications 108a and 108b, respectively. Additionally shown in FIG. 1, the server(s) 104 includes an augmented reality system 102. Further shown in FIG. 1, the augmented-reality-computing devices 106a and 106b are associated with users 112a and 112b, respectively.

The augmented-reality-computing devices 106a and 106b, and the server(s) 104 communicate via the network 110, which may include one or more networks and may use one or more communication platforms or technologies suitable for transmitting data and/or communication signals. In one or more embodiments, the network 110 includes the Internet or World Wide Web. The network 110, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks.

Although FIG. 1 illustrates a particular arrangement of the augmented-reality-computing devices 106a and 106b, the server(s) 104, and the network 110, various additional arrangements are possible. For example, the augmented-reality-computing devices 106a and 106b may directly communicate with the augmented reality system 102, bypassing the network 110. Further, the environment 100 can include any number of augmented-reality-computing devices communicating with the augmented reality system 102. Additional details relating to the network 110 are explained below with reference to FIG. 10.

Although FIG. 1 illustrates the augmented reality system 102 hosted by the server(s) 104, the functionality of the augmented reality system 102 may reside elsewhere. For example, some or all of the functionality of the augmented reality system 102 may be performed by the augmented reality applications 108a and 108b on the augmented-reality-computing devices 106a and 106b, respectively. Thus, the augmented-reality-computing devices 106a and 106b can generate and display or otherwise present augmented reality experiences in the absence of a network connection to the augmented reality system 102. Additionally or alternatively, the augmented-reality-computing devices 106a and 106b can provide an image stream of a physical environment to the augmented reality system 102 via the network 110, and then receive and display data for an augmented reality experience generated by the augmented reality system 102. Additionally or alternatively, the augmented-reality-computing devices 106a and 106b may receive data comprising computer-executable rendering instructions from the augmented reality system 102 and generate a rendering of an augmented reality experience based on the rendering instructions.

As suggested above, the augmented-reality-computing devices 106a and 106b each include an augmented reality display, a video capturing device (e.g., a digital camera), and an audio playback mechanism (e.g., headphones). For example, in one or more embodiments, the augmented reality display of the augmented-reality-computing devices 106a and 106b displays a virtual graphic overlay displayed in connection with the wearer's normal view. In at least one embodiment, the augmented reality display operates as a pair of lenses (e.g., eye glass lenses, contact lenses) positioned over the wearer's eyes. Additionally, in one or more embodiments, the video capturing devices associated with the augmented-reality-computing devices 106a and 106b are micro digital video cameras mounted (e.g., to an earpiece, or over the bridge of the wearer's nose) to the augmented-reality-computing devices 106a and 106b, respectively. Further, the audio playback mechanism of the augmented-reality-computing devices 106a and 106b may include right and left headphones, ear buds, or speakers built into a portion of the augmented-reality-computing devices 106a and 106b (e.g., built into the earpieces). Thus, in some embodiments, the augmented-reality-computing devices 106a and 106b are similar to eyeglasses with all the component parts built-in. In one or more embodiments, the augmented-reality-computing devices 106a and 106b also include at least one processor capable of executing software code.

As mentioned above, in some embodiments, the augmented reality system 102 anchors acoustic or graphical features of an augmented reality experience to a physical object in a physical environment based on the physical object being analogous to a virtual object in the augmented reality experience. More specifically, the augmented reality system 102 can render or otherwise present the augmented reality experience without utilizing the analogous virtual object, but rather utilizing the physical object. In accordance with one or more embodiments, FIG. 2 illustrates an overview of the augmented reality system 102 determining a physical object from a physical environment corresponds to an analogous virtual object for an augmented reality experience and presenting the augmented reality experience by modifying one or more features of the experience to integrate the physical object.

Figure 2:
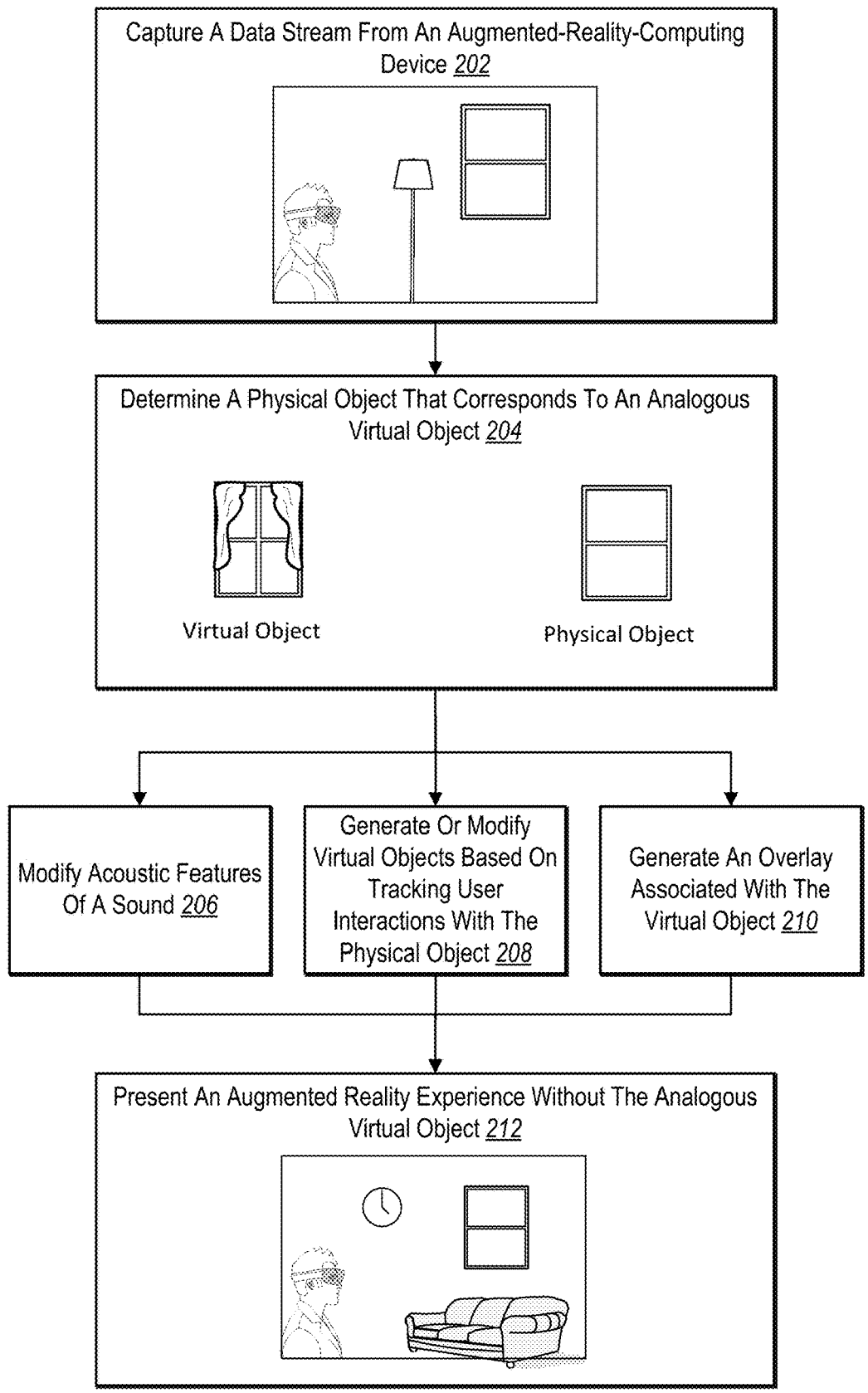
FIG. 2 illustrates an overview of an augmented reality system determining a physical object corresponds to an analogous virtual object for an augmented reality experience and presenting the augmented reality experience by modifying one or more features of the experience to integrate the physical object in accordance with one or more embodiments.

As depicted, FIG. 2 illustrates the augmented reality system 102 capturing a data stream from an augmented-reality-computing device 202. In one or more embodiments, the augmented reality system 102 can capture an image stream via a camera of the augmented-reality-computing device. The augmented reality system 102 can receive the image steam over a network connection with the augmented-reality-computing device. Additionally or alternatively, the augmented reality system 102 can capture and process the image stream from the camera at the augmented-reality-computing device.

The augmented reality system 102 can further determine a physical object corresponds to an analogous virtual object 204. More specifically, the augmented reality system 102 can determine that a physical object in the physical environment corresponds to an analogous virtual object in the augmented reality experience. In one or more embodiments, the augmented reality system 102 makes this determination in part by mapping the physical environment to identify the physical objects in the physical environment. For example, the augmented reality system 102 can utilize or implement a SLAM system to extract area indicators (e.g., walls, floor, ceiling) and objects (e.g., windows, furniture, books, dishes, toys, TVs) of the physical environment, determine a location of the augmented-reality-computing device within the physical environment, and calculate distances (e.g., horizontal, vertical, and angular) between the augmented-reality-computing device and the extracted area indicators and objects.

In one or more embodiments, the augmented reality system 102 further inventories the physical objects in the physical environment. For example, the augmented reality system 102 can utilize image analysis, web-lookups, and other techniques to identify and classify the physical environment objects.

For instance, utilizing any of these techniques, the augmented reality system 102 determines (i) that a particular shape or outline in the physical environment is an object and (ii) a category or classification associated with the object based on broad categories or classifications, such as "furniture," "book," "décor." Based on the broad classification of the object, the augmented reality system 102 can further determine additional features and characteristics of the object, such as the functionality of the object, the physical limitations of the object, and so forth. In at least one embodiment, the augmented reality system 102 can store all this information in association with the identified physical object for later use in generating and presenting an augmented reality experience.

Similarly, the augmented reality system 102 can inventory virtual objects associated with an augmented reality experience. For example, the augmented reality system 102 can access an augmented reality scene of an augmented reality experience to determine one or more virtual objects associated with the augmented reality scene. In one or more embodiments, the augmented reality system 102 can analyze metadata, display instructions, and other information associated with the augmented reality scene to identify virtual objects included in the augmented reality scene. The augmented reality system 102 can further identify a type or classification of the virtual objects based on image analysis, metadata, or other display instructions associated with the augmented reality scene. Based on the identified type or classification, the augmented reality system 102 can further determine features and characteristics of the virtual objects.

The augmented reality system 102 can then determine that one or more physical objects of the physical environment correspond to one or more virtual objects of the augmented reality experience based on the identified characteristics and features of both the virtual objects of the augmented reality experience and the physical objects of the physical environment. For example, the augmented reality system 102 can calculate an object-matching score between each physical object and each virtual object indicating a degree to which one or more features or characteristics of each physical object match one or more features or characteristics of each virtual object.

Briefly, in some cases, the augmented reality system 102 can calculate the object-matching score between a physical object and a virtual object by adding a point or value to the object-matching score for each matching characteristic and/or feature identified between the two objects. In at least one embodiment, the augmented reality system 102 can further weight the point or value based on a relevancy associated with the matching characteristic and/or feature (e.g., as with a characteristic and/or feature indicating appearance or function).

In one or more embodiments, the augmented reality system 102 determines that a particular physical object corresponds to a particular virtual object when the object-matching score between the two objects satisfies an object-matching threshold. If the object-matching score associated with a particular physical object and a particular virtual object satisfies the object-matching threshold, the augmented reality system 102 can determine that the physical object corresponds to the analogous virtual object.

As further shown in FIG. 2, the augmented reality system 102 can generate or modify various acoustic or graphical features for the augmented reality experience based on the physical object corresponding to the analogous virtual object. For example, in one or more embodiments, the augmented reality system 102 can modify one or more acoustic features of a sound for the augmented reality experience to simulate that the sound originates from the physical object 206. In at least one embodiment, the augmented reality system 102 can modify the acoustic features of the sound based on horizontal, vertical, and angular distances between the location of the physical object and the augmented-reality-computing device, as well as on other spectral localization cues. The augmented reality system 102 can further modify the acoustic features based on characteristics of the physical object. In some cases, the overall effect of modifying the acoustic features is to simulate, from the perspective of the user of the augmented-reality-computing device, that the sound originates from the physical object, even though the physical object is not actually producing the sound.

In additional or alternative embodiments, the augmented reality system 102 can generate or modify virtual objects based on tracking user interactions with the physical object 208. For example, the augmented reality system 102 can track user interactions with the physical object as part of a game or other augmented reality experience. To illustrate but one example, the augmented reality system 102 can track user interactions with a physical remote control to change the television channel displayed on a virtual television screen within the augmented reality experience.

In an additional or alternative embodiment, the augmented reality system 102 can generate a virtual graphic overlay associated with the virtual object 210. For example, the augmented reality system 102 can generate the virtual graphic overlay based on the analogous virtual object to cover or obscure all or a portion of the physical object when the virtual graphic overlay is positioned at the location of the physical object. The augmented reality system 102 can generate the virtual graphic overlay based on visual characteristics of the analogous virtual object, such that the overlay causes the physical object to appear differently to the user of the augmented-reality-computing device. Additionally or alternatively, the augmented reality system 102 can generate the virtual graphical overlay based on a difference between the physical object and the analogous virtual object by rendering only a portion of a virtual object that differs from an analogous physical object. In at least one embodiment, the augmented reality system 102 can update or replace the virtual graphic overlay based on further user interactions with an area of the physical object on which the virtual graphic overlay is superimposed.

As further shown in FIG. 2, the augmented reality system 102 can further present the augmented reality experience without the analogous virtual object 212. As suggested above, in some cases, the augmented reality system 102 presents the augmented reality experience using the physical object rather than an analogous virtual object. For example, in response to determining the object-matching score between the two objects is greater than or equal to the object-matching threshold, the augmented reality system 102 can determine that the virtual object is analogous to the physical object and anchor one or more features of the augmented reality scene to the physical object rather than rendering the analogous virtual object. For instance, the augmented reality system 102 can associate the one or more features of the augmented reality experience with the location of the physical object, as determined via SLAM or a similar algorithm. In at least one embodiment, the augmented reality system 102 can present the augmented reality experience for display via the augmented-reality-computing device without the analogous virtual object. In some cases, the augmented reality system 102 can present the augmented reality experience comprising virtual audio (e.g., sound effects) via the augmented-reality-computing device without the analogous virtual object or other virtual objects.

Figure 3A:
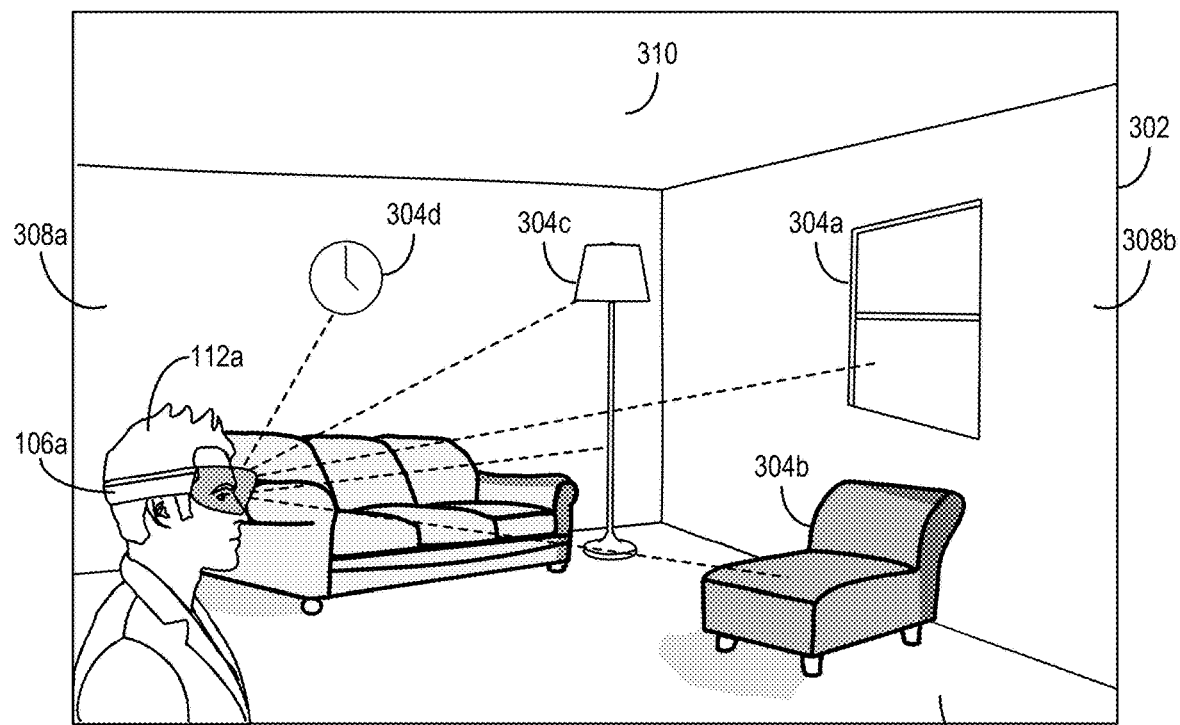
FIG. 3A illustrates a view of an augmented reality system mapping a physical environment and localizing an augmented-reality-computing device in accordance with one or more embodiments.
Figure 3B:
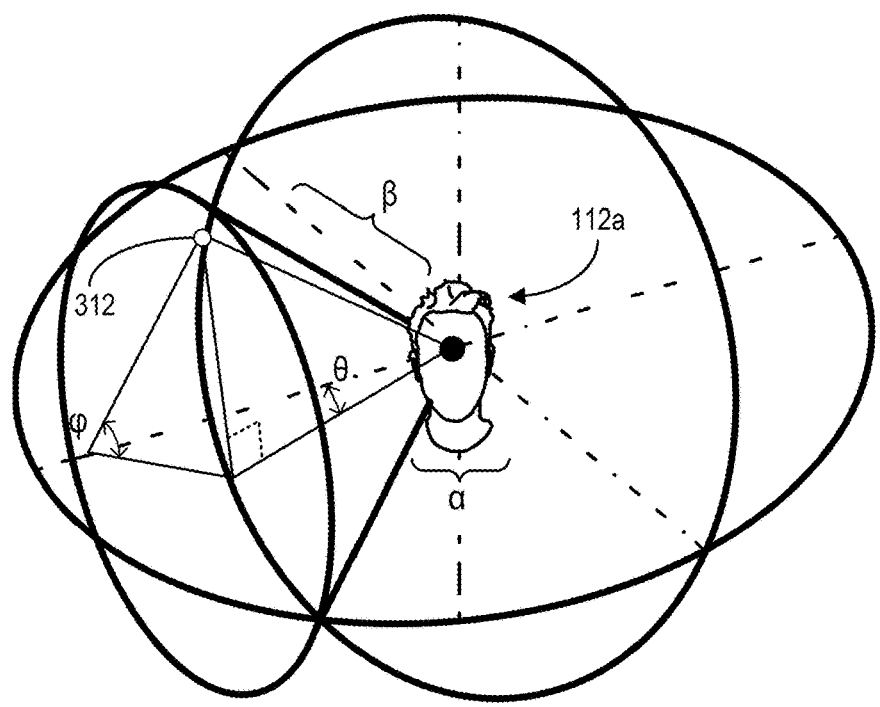
FIG. 3B illustrates a schematic of an augmented reality system leveraging the process by which a user localizes a sound in accordance with one or more embodiments.

FIGS. 3A and 3B illustrate additional detail with regard to the augmented reality system 102 rendering an augmented reality experience and modifying features of the augmented reality experience. For example, FIG. 3A illustrates the augmented reality system 102 determining objects and locations within a physical environment. FIG. 3B illustrates the augmented reality system 102 modifying acoustic features of a sound for an augmented reality experience to simulate that the sound originates from a particular physical object in the physical environment.

As shown in FIG. 3A, the user 112a can view a physical environment 302 through a display of the augmented-reality-computing device 106a. As further shown in FIG. 3A, the physical environment 302 includes physical objects 304a, 304b, 304c, 304d, and other area indicators such as a floor 306, walls 308a, 308b, and a ceiling 310. In one or more embodiments, prior to rendering or providing an augmented reality experience including virtual objects, the augmented reality system 102 maps the physical environment 302 utilizing an image stream captured by the augmented-reality-computing device 106a. For example, the augmented reality system 102 can utilize a mapping protocol, such as SLAM to determine: (i) the three-dimensional position of the augmented-reality-computing device 106a within the physical environment 302 and (ii) the spatial relationships between the augmented-reality-computing device 106a and the area indicators and objects in the physical environment 302.

In one or more embodiments, the augmented reality system 102 utilizes environmental sensor data to map the physical environment 302 and localize the augmented-reality-computing device 106a. For example, the augmented reality system 102 can utilize the image stream captured by one or more cameras of the augmented-reality-computing device 106a. Additionally, the augmented reality system 102 may utilize additional environmental sensor data originating from the augmented-reality-computing device 106a including, but not limited to, gyroscopic data, accelerometer data, light sensor data, depth sensor data, and GPS data.

Based on this environmental sensor data, the augmented reality system 102 can identify the area indicators of the physical environment 302. For example, the augmented reality system 102 can identify the walls 308a, 308b, the floor 306, and the ceiling 310 based on an analysis of the captured image stream in connection with the additional environmental sensor data. In one or more embodiments, the augmented reality system 102 can further differentiate the physical objects 304a-304d from the area indicators of the physical environment 302. For example, utilizing the image stream and other environmental sensor information, the augmented reality system 102 can identify and further classify the physical objects 304a-304d within the physical environment 302.

In one or more embodiments, the augmented reality system 102 identifies the physical objects 304a-304d by utilizing image analysis techniques in connection with outlines within the physical environment 302 to determine an object, object type, and/or object classification associated with each outline. For example, the augmented reality system 102 can utilize image comparison to find a closest match between an area of the physical environment 302 (e.g., an outline within the physical environment 302) to a known object. Based on metadata and other information associated with the matched known object, the augmented reality system 102 can extrapolate that the area within the physical environment 302 is associated with a physical object that has certain characteristics and/or features.

The augmented reality system 102 can also determine spatial relationships between the area indicators of the physical environment 302, the physical objects 304a-304d within the physical environment 302, and the augmented-reality-computing device 106a. For example, the augmented reality system 102 can determine distances between the augmented-reality-computing device 106a and each of the physical objects 304a-304d. In one or more embodiments, based on the image stream and other environmental sensor data, the augmented reality system 102 can determine one or more of a vertical distance, a horizontal distance, and an angular distance between the augmented-reality-computing device 106a and each of the physical objects 304a-304d.

Based on these spatial relationships, the augmented reality system 102 can generate a virtual map (e.g., a sparse reconstruction, a dense 3D point cloud) of the physical environment 302 relative to the augmented-reality-computing device 106a. For example, the augmented reality system 102 can generate the map including the locations of the physical objects 304a-304d relative to the augmented-reality-computing device 106a and each other. Based on this map and continued movement tracking associated with the augmented-reality-computing device 106a, the augmented reality system 102 can maintain accurate positioning of the physical objects 304a-304d as well as the location of the augmented-reality-computing device 112 within the physical environment 302. In one or more embodiments, the augmented reality system 102 utilizes the continually updated location of the augmented-reality-computing device 106a within the generated three-dimensional map of the physical environment 302 to accurately anchor features of an augmented reality experience to one or more physical objects.

As noted above, FIG. 3B illustrates the augmented reality system 102 modifying acoustic features of a sound to simulate the sound originating from a particular physical object in the physical environment. In one or more embodiments, the augmented reality system 102 modifies acoustic features of a sound in a way to stimulate the user 112a to identify the location or origin of the sound in direction and distance. For example, FIG. 3B depicts the user 112a localizing a sound 312 and the augmented reality system 102 leveraging this information to successfully "slide" sounds from the perspective of the user 112a. As discussed below, the user 112a localizes the sound 312 based on time and intensity differences between both ears, spectral localization cues, and other signals.

In one or more embodiments, the user 112a localizes the sound 312 in three dimensions based on a horizontal angle between the center of the head of the user 112a and the source of the sound 312, the vertical angle between the center of the head of the user 112a and the source of the sound 312, and the distance between the center of the head of the user 112a and the source of the sound 312. But the way the user 112a hears the sound 312 is further altered by the head of the user 112a, which acts as a barrier to change the timbre, intensity, and spectral qualities of the sound 312—further helping the user 112a determine the origin of the sound 312.

In at least one embodiment, the augmented reality system 102 quantifies and represents the way the user 112a hears the sound 312 using a function, such as the Head-Related Transfer Function ("HRTF"). For example, the Head-Related Transfer Function can be represented as:

$$H_L = H_L(\beta,\theta,\varphi,\omega,\alpha) = P_L(\beta,\theta,\varphi,\omega,\alpha)/P_0(\beta,\omega)$$

$$H_R = H_R(\beta,\theta,\varphi,\omega,a) = P_R(\beta,\theta,\varphi,\alpha)/P_0(\beta,\omega)$$

Where L and R represent the left ear and right ear, respectively, of the user 112a. $P_L$ and $P_R$ represent the amplitude of sound pressure at the entrances of the left and right ear canals of the user 112a. $P_0$ is the amplitude of sound pressure at the center of the head of the user 112a (if the user 112a did not exist). More generally, as illustrated in FIG. 3B, the Head-Related Transfer Functions $H_L$, and $H_R$ are functions of sound source angular position θ, elevation angle φ, distance between the sound source and the center of the head of the user 112a β, the angular velocity ω (if the sound is moving rather than stationary), and the equivalent dimension of the head of the user 112a α. Based on these functions, the user 112a can effectively discern the approximate location of the source of the sound 312. Note that FIG. 3B illustrates the sound 312 as stationary.

The augmented reality system 102 can exploit the functions by which the user 112a hears the sound 312 to simulate the sound 312 originating from a physical object in a physical environment, rather than inside the head of the user 112a. As indicated above, sounds appear to come from inside the listener's head unless those sounds are somehow modified. For example, the augmented reality system 102 can modify the playback balance between left and right headphones of the augmented-reality-computing device 106a, and/or the playback volume between left and right headphones of the augmented-reality-computing device 106a. The augmented reality system 102 can further angle one or more playback channels of the left and right headphones of the augmented-reality-computing device 106a to alter the amplitude of sound pressure at the entrance to the ears of the user 112a.

Moreover, the augmented reality system 102 can change the timing of playback between the left and right headphones of the augmented-reality-computing device 106a to simulate the sound 312 originating from a physical object or simulate an effect on the sound 312 by the physical object. For example, the human auditory system utilizes timing differences between when a sound arrives at the left and at the right ear to determine a relative angle from which the sound originates. To illustrate, because the sound 312 originates to the right of the user 112a, the sound 312 arrives at the right ear of the user 112a before it arrives at the left ear of the user 112a—due at least in part to the fact that the sound 312 has to travel around the user's head. Thus, the augmented reality system 102 can mimic this effect by changing the timing of when the sound 312 is played out of left and right headphones to effectively fool the user 112a into thinking that the sound 312 originates at an angle outside his or her head.

Additionally, in some embodiments, the augmented reality system 102 can apply a filter to the sound 312 to mimic the localization of the sound 312 at the position of the physical object. For example, the augmented reality system 102 can apply a filter to the sound 312 that changes one or more levels of the sound 312, that degrades or enhances the sound 312, or alters or effects other qualities of the sound 312 to simulate that the sound originates from the physical object or to simulate an effect on the sound by the physical object. In any of these ways, the augmented reality system 102 leverages the ways that the human brain processes and understands sound to cause the user 112a to understand that the sound 312 originates at and/or is affected by a physical object. For example, in some embodiments, the augmented reality system utilizes work by Facebook Reality Labs in sound propagation to generate spatial audio and allows for volumetric and ambisonic sounds. Additional information related to such work can be found at creator.oculus.com/learn/spatial-audio/or oculus.com/blog/simulating-dynamic-soundscapes-at-facebook-reality-labs/.

In one or more embodiments, the augmented reality system 102 can further account for a room impulse response in modifying acoustic features of a sound. For example, based on the map of the physical environment, the augmented reality system 102 can identify and account for echo and reverberation properties of the physical environment when modifying acoustic features of the sound. To illustrate, the augmented reality system 102 can add reverberation to a sound in respond to determining that the physical environment is in a six-sided room (e.g., a functional cube) with a specific size. The augmented reality system 102 may not add reverberation to a sound in response to determining that the physical environment is outside in an area with no walls or large objects off of which a sound would bounce.

In one or more embodiments, the augmented reality system 102 may consolidate or reduce a number of audio streams to reduce a number of times HRTF is calculated. For example, if a sound of an augmented reality experience includes multiple audio streams or sound sources. To illustrates, a car might produce sound from the engine, from the muffler, and from the internal stereo—thereby creating three audio streams from three sound sources. A conventional system might calculate the HRTF for each audio stream to further modify the acoustic features of the corresponding sounds. The augmented reality system 102, however, leverages the fact that most human hearing is not fine-tuned enough to tell the difference between each individual audio streams (e.g., depending on how far apart the audio streams are from each other).

Based on the HRTF, the augmented reality system 102 can consolidate or reduce two or more of the audio streams without degrading the overall auditory experience for user, while simultaneously generating various computational efficiencies. For example, if a sound of an augmented reality experience (e.g., the sound of a car) includes three audio streams (e.g., one for the engine, one for the muffler, one for the internal stereo), the augmented reality system 102 can combine the audio streams for the engine and muffler. Thus, to modify various acoustic features of the sound, the augmented reality system 102 only needs to calculate the HRTF for two audio streams rather than three, thereby saving any computing resources that may have been spent in calculating the third HRFT.

Figure 4A:
FIGS. 4A-4D illustrate an augmented reality system modifying one or both of graphic and acoustic features of an augmented reality experience to integrate a physical object within the experience in accordance with one or more embodiments.
Figure 4B:
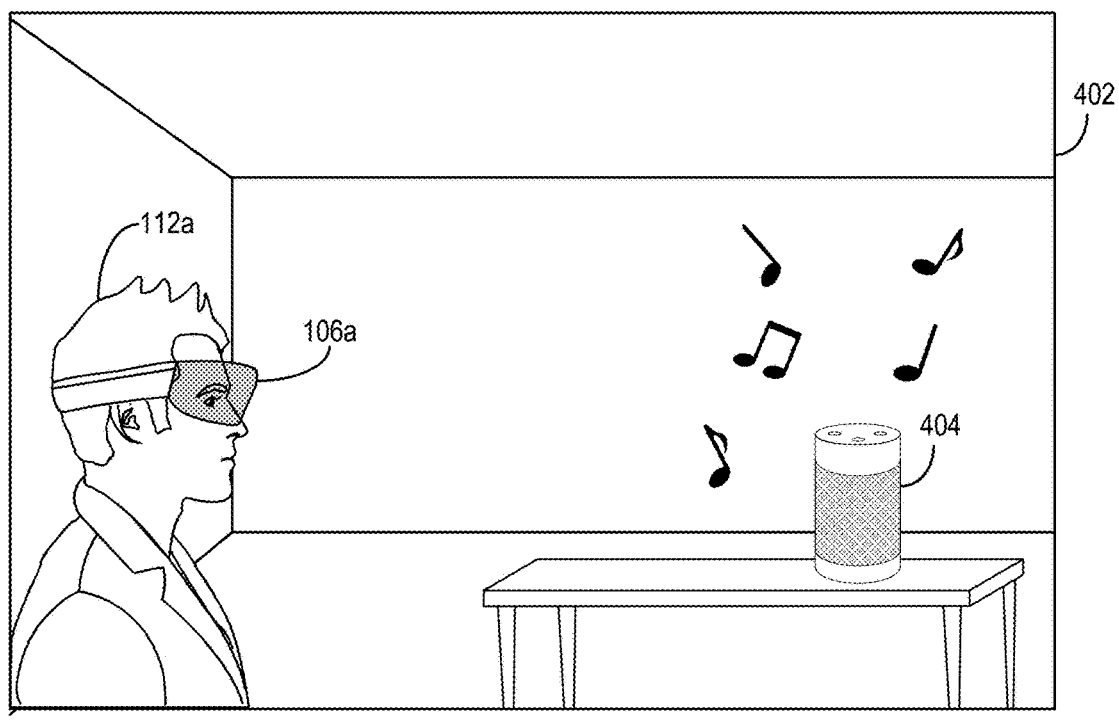
Figure 4C:
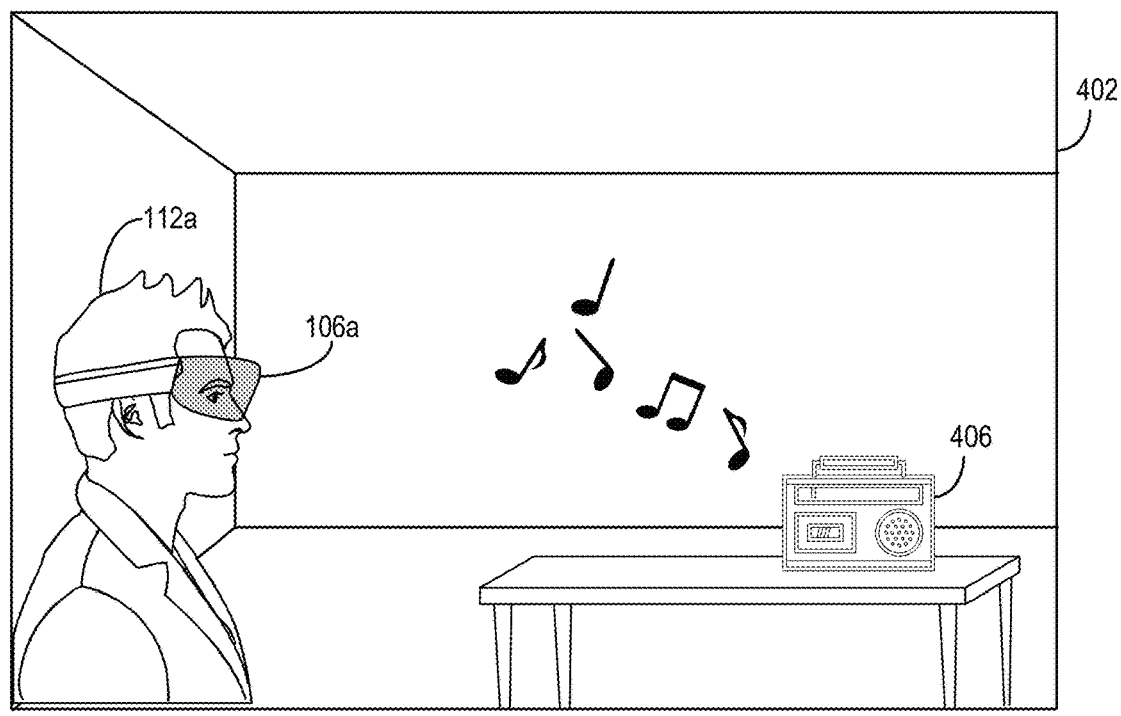
Figure 4D:
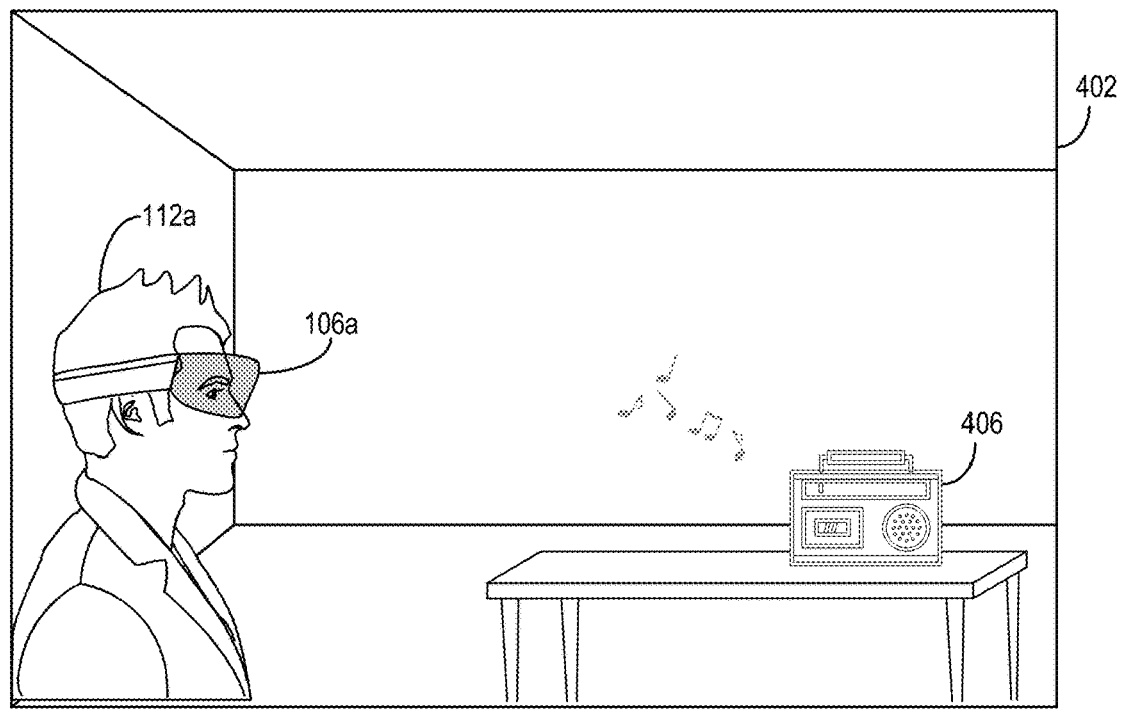

As discussed above, the augmented reality system 102 can anchor acoustic or graphical features of an augmented reality experience to a physical object in a physical environment. FIGS. 4A-4D illustrate an example of the augmented reality system 102 determining that a physical object in the physical environment corresponds to an analogous virtual object for an augmented reality experience and anchoring acoustic features of a sound from the augmented reality experience to the physical object. For example, as shown in FIG. 4A, the user 112a may be in a physical environment 402. As further shown in FIG. 4A, the physical environment 402 includes various physical objects, including a physical object 404. In contrast to FIG. 4A, in some embodiments, FIGS. 4B-4D depict the augmented reality system 102 both rendering augmented reality experiences for display on the augmented-reality-computing device 106a and generating music (or other sounds) associated with the augmented reality scenes through headphones connected to the augmented-reality-computing device 106a. Alternatively, FIGS. 4B-4D can depict the augmented reality system 102 presenting augmented reality audio-only experiences (e.g., as in FIG. 4B), and combined audio and visual experiences (e.g., as in FIGS. 4C and 4D) via the augmented-reality-computing device 106a.

As shown in FIG. 4B, for instance, the user 112a can wear the augmented-reality-computing device 106a. In one or more embodiments, as discussed above, the augmented-reality-computing device 106 may include one or more micro-cameras, gyroscopes, accelerometers, processors, headphones, speakers, microphones, and so forth. In response to the user activating the augmented-reality-computing device 106a and/or selecting a particular augmented reality experience (e.g., an experience that enables the user to listen to music), the augmented reality system 102 can capture and utilize an image stream and other environmental sensor data from the augmented-reality-computing device 106a to map the physical environment 402. The augmented reality system 102 can further utilize the generated map to determine the relative position of the augmented-reality-computing device 106a to physical objects. For example, as discussed above, the augmented reality system 102 can utilize SLAM to determine the location of the augmented-reality-computing device 106a, and the horizontal, vertical, and angular distance between the augmented-reality-computing device 106a and the physical object 404.

The augmented reality system 102 can further identify and classify the physical object 404. For example, the augmented reality system 102 can analyze an image frame from the image stream captured by the augmented-reality-computing device 106a to determine that the physical object 404 is a smart speaker utilizing a wireless protocol. Based on identifying the physical object 404 as a smart speaker, the augmented reality system 102 can further utilize web lookups, database lookups, and other info to determine features and characteristics associated with the physical object 404. For example, the augmented reality system 102 can determine that the physical object 404 can play audio based on data transmitted via a wireless protocol and the physical object 404 has a particular size. In some embodiments, the augmented-reality-computing device 106a detects a wireless broadcast signal from the physical object 404, such as a BLUETOOTH broadcast signal.

As indicated above, the augmented reality system 102 can determine an object-matching score indicating a degree to which one or more of the features or characteristics of the physical object 404 match those of various virtual objects in an augmented reality experience. For example, in response to detecting the user 112a selecting an augmented reality experience that includes music, the augmented reality system 102 can further identify the virtual objects corresponding to the augmented reality experience for the music-listening augmented reality experience. In some embodiments, the augmented reality system 102 determines that a selected augmented reality experience includes virtual objects that match a particular music (e.g., virtual object for a music video or video game). In other embodiments, the augmented reality system 102 determines that an augmented reality experience associated with the music-listening augmented reality experience includes a single virtual object—such as a 1990's era virtual stereo that plays the music corresponding to the augmented reality experience.

As a further example, in some embodiments, in response to detecting the user 112a selecting an augmented reality experience that includes only music, the augmented reality system 102 can utilize the physical object 404 based on determining that the characteristics of the physical object 404 (e.g., produces audio) match characteristics of the audio-only augmented reality experience. In one or more embodiments, the augmented reality system 102 can utilize the physical object 404 by anchoring sounds of the audio-only augmented reality experience to the physical object 404. For example, the augmented reality system 102 can anchor or associate acoustic features of a sound of the audio-only augmented reality experience with a location of the physical object 404 relative to the augmented-reality-computing device 106a. In one or more embodiments, the augmented reality system 102 can store this association in connection with the augmented reality experience until the anchored features are triggered or required within the augmented reality experience.

For example, in response to determining that a sound (e.g., music playback) associated with the augmented reality experience should be heard by the user 112a via the augmented-reality-computing device 106a (e.g., in response to the user 112a selecting a "play" option associated with the augmented reality experience), the augmented reality system 102 can modify the anchored acoustic features to simulate that the sound originates from the physical object 404. In one or more embodiments, the augmented reality system 102 can modify the acoustic features of the sound based on the location of the physical object 404 relative to the augmented-reality-computing device 106a.

For instance, as discussed above, the augmented reality system 102 can modify the acoustic features of the sound based on (i) the distance between the location of the physical object 404 and the augmented-reality-computing device 106a, (ii) other spectral localization cues associated with the location of the physical object 404, and (iii) any visual characteristics of the physical object 404 (e.g., the size of the physical object 404a, the direction the physical object 404a is pointed). In at least one embodiment, the augmented reality system 102 can modify the acoustic features of the sound based on these considerations such that the amplitude of sound pressure interacting with the ears of the user 112a causes the user 112a to think that the sound of the augmented reality experience is originating from the physical object 404. The augmented reality system 102 can likewise modify acoustic features as described in this paragraph when an augmented reality experience comprises virtual objects.

In one or more embodiments, the augmented reality system 102 can utilize metadata associated with the augmented reality experience, alone or in connection with image analysis of an image of the virtual stereo, to identify features and characteristics of the virtual stereo. For example, the augmented reality system 102 can determine that the characteristics of the virtual stereo include that the virtual stereo can play sounds, and that the portable stereo has a particular size, shape, and appearance. If the augmented reality experience includes additional virtual objects, the augmented reality system 102 can repeat this process for each virtual object associated with the augmented reality experience.

In at least one embodiment, the augmented reality system 102 calculates object-matching scores based on the features or characteristics of the physical object 404 and the identified features or characteristics of each virtual object in the augmented reality experience. For example, the augmented reality system 102 can calculate the object-matching score between the physical object 404 and the virtual stereo indicating a degree to which characteristics or features of the physical object 404 match those of the virtual stereo. For instance, the augmented reality system 102 can calculate the object-matching score for the physical object 404 and the virtual stereo by adding an amount or point to the object-matching score for each identified match between the features or characteristics of the physical object 404 and features or characteristics of the virtual stereo.

In one or more embodiments, the augmented reality system 102 can further weight the amount or point added to the score based on a relevance of a feature that matches between the two objects. For example, if the matched feature goes to the functionality of the objects (e.g., as with the feature indicating that both objects play sounds), the augmented reality system 102 can add an extra weight to the amount or point added to the object-match score for the physical object 404a and the virtual stereo.

In one or more embodiments, the augmented reality system 102 can determine that the virtual stereo in the augmented reality experience is analogous to the physical object 404 based on the object-matching score. For example, the augmented reality system 102 can determine that the virtual stereo represents the virtual object associated with the highest calculated object-matching score is analogous to the physical object 404. In the current example, the augmented reality system 102 can determine that the virtual stereo is analogous to the physical object 404 based on the object-matching score between the two objects being the highest score calculated in connection with the virtual objects in the augmented reality experience. As further indicated above, in some embodiments, the augmented reality system 102 determines that the virtual object is analogous to the physical object 404 based on the object-matching score between the two objects satisfying an object-matching threshold.

For example, the object-matching threshold for the current augmented reality experience may be an object-matching score of 5. The augmented reality system 102 may calculate an object-matching score between the physical object 404 and the virtual stereo of the augmented reality experience to be at least 5 based on various weighted and unweighted feature matches. For instance, the augmented reality system 102 may determine that certain appearance features match between the two objects because both objects have speaker covers or grills and playback buttons. The augmented reality system 102 may further determine that there is a functionality match between the two objects because both include speaker cones and gaskets for producing sound. The augmented reality system 102 may further weight either or both of these matches because they are related to the relevancy of both objects. Accordingly, because the resulting object-matching score satisfies the object-matching threshold, the augmented reality system 102 can determine that the virtual stereo is analogous to the physical object 404 in the physical environment 402.

Returning to FIG. 4B, in response to determining that the virtual stereo is analogous to the physical object 404, the augmented reality system 102 can anchor one or more acoustic or graphical features of the augmented reality experience to the physical object 404. For example, and as discussed above, the augmented reality system 102 can anchor or associate acoustic features of a sound of the augmented reality experience with a location of the physical object 404 relative to the augmented-reality-computing device 106a. In one or more embodiments, the augmented reality system 102 can store this association in connection with the augmented reality experience until the anchored features are triggered or required within the augmented reality experience.

In one or more embodiments, the augmented reality system 102 can also modify the anchored acoustic features to further save computing resources associated with the augmented-reality-computing device 106a. As discussed above, objects can create complex sounds that include multiple audio streams, such as an engine that generates different sounds from fan blades, belts, or pistons. In one or more embodiments, the augmented reality system 102 can modify one or more of the audio streams of a complex sound by degrading, softening, or silencing one or more of the audio streams.

Additionally or alternatively, the augmented reality system 102 can consolidate or reduce two or more of the audio streams to further save computing resources. In at least one embodiment, the augmented reality system 102 can modify or consolidate the audio streams such that the sound, as heard by the user 112a, is not diminished. For example, as discussed above, if a sound of an augmented reality experience (e.g., the sound of a car) includes three audio streams (e.g., one for the engine, one for the muffler, one for the internal stereo), the augmented reality system 102 can combine the audio streams for the engine and muffler. The human auditory system is generally not fine-tuned enough to determine any loss of audio quality based on this consolidation of audio streams.

Thus, as shown in FIG. 4B, the augmented reality system 102 can anchor acoustic features of music playback in the augmented reality experience to the physical object 404. When the music playback is triggered, requested, or otherwise initiated, the augmented reality system 102 modifies the acoustic features of the music playback to simulate that the music playback originates from the physical object 404. Accordingly, from the perspective of the user 112a, the smart speaker physical object 404 is the source of the music playback within the augmented reality experience, even though the physical object 404 is not making any sound within the physical environment 402.

In one or more embodiments, the augmented reality system 102 can anchor graphical features of the augmented reality experience to the physical object 404. For example, as shown in FIG. 4C, in response to determining that the virtual stereo is analogous to the physical object 404, the augmented reality system 102 can generate a virtual graphic overlay 406. The augmented reality system 102 can further render the virtual graphic overlay 406 within the augmented reality experience at a position relative to the augmented-reality-computing device 106a such that the physical object 404 is partially or totally covered or obscured by the virtual graphic overlay 406.

For example, in response to determining that the virtual stereo is analogous to the physical object 404, the augmented reality system 102 can identify one or more visual characteristics of the virtual stereo. More specifically, the augmented reality system 102 can identify visual characteristics that indicate a size, a color, an appearance, a surface texture, and/or other visual characteristics of the virtual stereo. Utilizing the identified visual characteristics, the augmented reality system 102 can generate the virtual graphic overlay 406. In at least one embodiment, the augmented reality system 102 can then overlay the physical object 404 with the generated virtual graphic overlay 406. As shown in FIG. 4C, the augmented reality system 102 can render the virtual graphic overlay 406 such that the physical object 404 is completely obscured from the user 112a via the augmented-reality-computing device 106a.

In one or more embodiments, the augmented reality system 102 can further modify the anchored acoustic features of the augmented reality experience based on features associated with the analogous virtual object. For example, as shown in FIG. 4D, the augmented reality system 102 can identify a sound profile associated with the virtual stereo. The sound profile indicates a quality of sound and other intricacies of the sound produced by the virtual stereo. To illustrate, the virtual stereo may approximate the appearance and sound of a 1990's era boom box that plays music with a wide bass range and tinny high notes. In at least one embodiment, the augmented reality system 102 can identify this sound profile and modify the acoustic features of music in simulated playback from the physical object 404 to approximate the sound of music playing from a 1990's era boom box—rather than from a smart speaker. Thus, the augmented reality system 102 can degrade the acoustic features of the sound, enhance the acoustic features of the sound, and/or modify specific levels (e.g., treble, bass) and/or volumes (e.g., indicated by the smaller music notes in FIG. 4D) within the acoustic features of the sound to more closely approximate the sound profile associated with the virtual stereo.

Figure 5A:
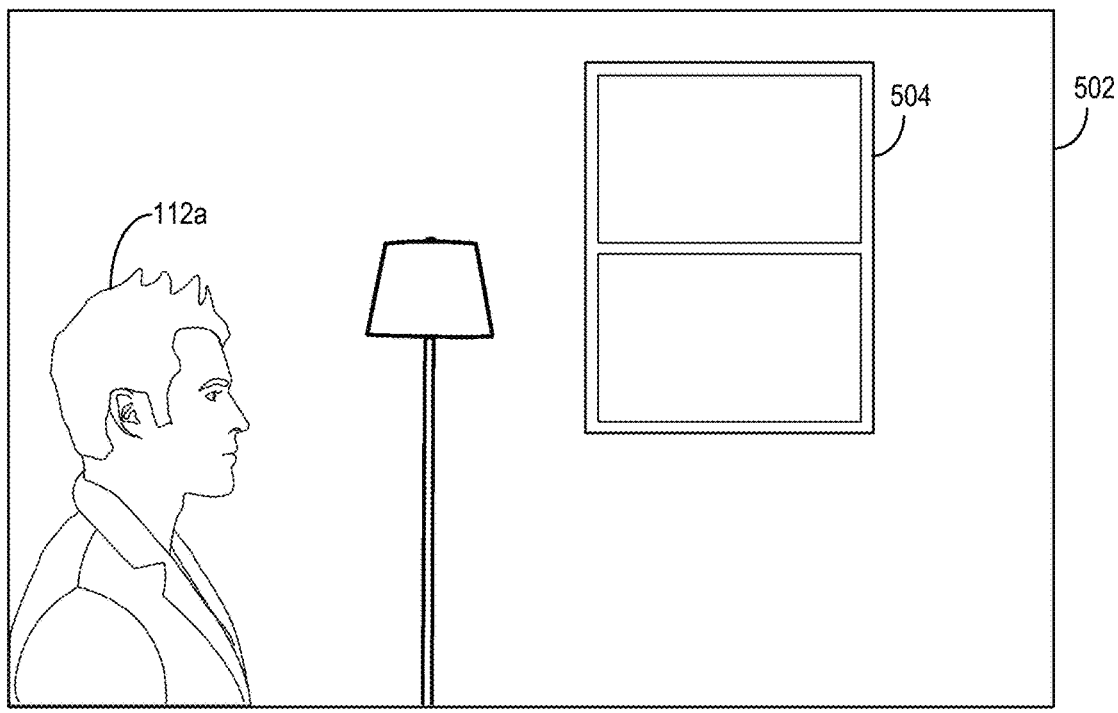
FIGS. 5A-5B illustrate an augmented reality system modifying acoustic features of an augmented reality experience based on physical characteristics of a physical object in accordance with one or more embodiments.
Figure 5B:
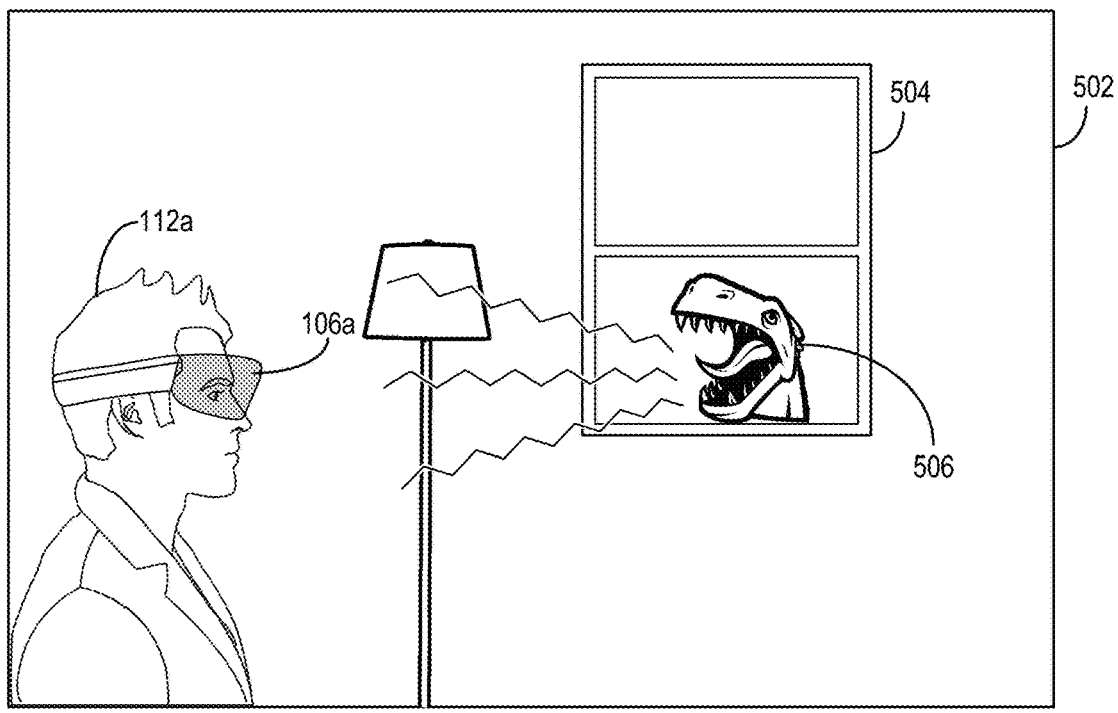

As mentioned above, the augmented reality system 102 can modify anchored features of an augmented reality experience based on a location or other characteristics of a physical object in the physical environment. FIGS. 5A and 5B illustrate to the augmented reality system 102 modifying anchored features of an augmented reality experience based on characteristics of a physical object. For example, as shown in FIG. 5A, the user 112a can be in a physical environment 502 including physical objects, such as a physical object 504. As shown in FIG. 5A, the physical object 504 is a physical or real-world window. In one or more embodiments, the physical object 504 has various physical characteristics, such as a size, a construction (e.g., including a number of sashes, casements, mullions, muntins, panes), a configuration (e.g., open or closed), and a thickness. In additional or alternative embodiments, physical objects can have physical characteristics including, but not limited to, a thickness, a mass, a size, a shape, and/or a density.

As shown in FIG. 5B, after the user 112a initiates the augmented-reality-computing device 106a, the augmented reality system 102 can map the physical environment 502 and determine the various characteristics of the physical object 504. For example, the augmented reality system 102 can determine the physical characteristics of the physical object 504 utilizing image analysis (e.g., from the image stream provided by the augmented-reality-computing device 106a), image recognition, database lookups, or other algorithms, as described above. As discussed above, the augmented reality system 102 can further determine that a virtual object (e.g., a virtual window) in an augmented reality experience is analogous to the physical object 504. In one or more embodiments, the augmented reality system 102 can store the correspondence between the virtual window and the physical object 504 (e.g., physical window), along with the physical characteristics of the physical object 504 for later use.

As further shown in FIG. 5B, the augmented reality system 102 renders the augmented reality experience to include a virtual animal 506 (e.g., a virtual dinosaur) walking past the virtual or physical window. In rendering the augmented reality experience for the augmented-reality-computing device 106a, the augmented reality system 102 can utilize the physical object 504 rather than rendering the virtual window. In one or more embodiments, the augmented reality system 102 can further modify acoustic features of any sound effects (e.g., dinosaur sound effects) within the augmented reality experience to simulate that the sound effects are originated from outside the window physical object 504—thereby distorting or otherwise muffling the sound effects.

For instance, depending on a pane thickness and size of the window as the physical object 504, the augmented reality system 102 can (i) decrease a volume of the sound effects, (ii) reduce one or more specific levels (e.g., treble, mid-range, bass) of the sound effects, (iii) consolidate or modify various audio streams associated with the dinosaur sound effects (e.g., a breathing sound, a foot-fall sound, a mouth opening sound), or (iv) otherwise distort the sound effects. By decreasing a volume, reducing a specific sound level, consolidating or modifying audio streams, the augmented reality system 102 can modify a sound for the augmented reality experience to simulate an effect on the sound by the physical object 504. As depicted in FIG. 5B, the augmented reality system 102 modifies a sound to simulate a filter effect on the sound (e.g., a dinosaur sound) by a window. In at least one embodiment, the augmented reality system 102 can modify the acoustic features of the sound effects based on the physical characteristics of the physical object 504 such that, from the perspective of the user 112a, the sound effects appear to originate outside the physical object 504, rather than originating at a location of the physical object 504 within the physical environment 502.

FIGS. 6A-6E illustrate additional examples of the augmented reality system 102 anchoring features of an augmented reality experience to a physical object based on a correspondence between the physical object and an analogous virtual object from the augmented reality experience. For example, in FIG. 6A, an augmented reality experience 602 may include a book as part of an augmented reality experiences. For example, the augmented reality experience 602 may be from a treasure hunt augmented reality experience and may include a particular interactive book among a collection of books, where the goal of the experience is to help the user 112a identify and interact with a particular book to receive a clue as to the next portion of the treasure hunt.

Figure 6A:
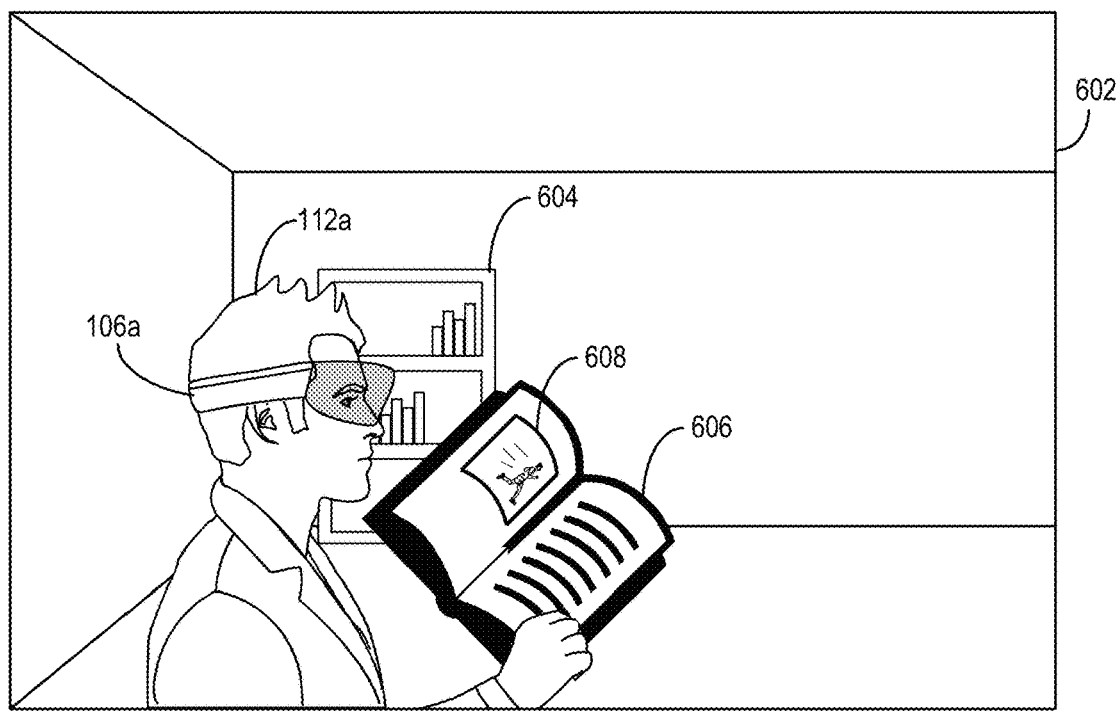
FIGS. 6A-6E illustrate an augmented reality system modifying graphic or interactive features of an augmented reality experience to integrate a physical object in accordance with one or more embodiments.

As indicated by FIG. 6A, the augmented reality system 102 can utilize SLAM in connection with an underlying physical environment to identify and classify a physical bookshelf 604 and a physical book 606. The augmented reality system 102 can further anchor one or more acoustic features of the augmented reality experience 602, such that a sound of the augmented reality experience 602 (e.g., music, character speech, drumbeats), appears to originate from a particular book from the physical bookshelf 604.

In at least one embodiment, the augmented reality system 102 can increase the volume of the sound of the augmented reality experience 602 as the user 112a moves closer to the particular book. For example, the augmented reality system 102 can analyze sequential images and other environmental sensor data from the augmented-reality-computing device 106a to determine a speed and direction of movement. The augmented reality system 102 can further use that speed and direction of movement in connection with the generated virtual map of the underlying physical environment to determine the relative distance between the user 112a and the particular book on the physical bookshelf 604. For instance, the augmented reality system 102 can utilize motion tracking algorithms, such as kernel-based tracking and/or contour tracking to determine speed and direction of motion associated with the augmented-reality-computing device 106a.

As further shown in FIG. 6A, when the user 112a opens the physical book 606, the augmented reality system 102 can generate and provide a virtual graphic overlay 608 to further the augmented reality experience. For example, the augmented reality system 102 can generate the virtual graphic overlay 608 to match or to retexture the physical book 606. The augmented reality system 102 can further generate the virtual graphic overlay 608 to include material specific to the augmented reality experience.

In one or more embodiments, the augmented reality system 102 can further adapt the virtual graphic overlay 608 to physical characteristics of the physical book 606. For example, the augmented reality system 102 can utilize SLAM to determine a size of the physical book 606 relative to the amount of augmented reality material that should be provided via interactions with the physical book 606. For example, if the augmented reality experience 602 includes providing the user 112a with four chapters of material via the book virtual object, the augmented reality system 102 can generate the virtual graphic overlay 608 to approximate a reading position within the augmented reality material when the user 112a opens the physical book 606.

To illustrate, when the augmented reality system 102 detects the user 112a opening the physical book 606 to a half-way-through reading position, the augmented reality system 102 can generate the virtual graphic overlay 608 to display the beginning of chapter three of the augmented reality materials (e.g., the augmented reality materials that are half-way through the total amount of augmented reality materials). As the augmented reality system 102 detects the user 112a continuing to flip through the physical pages of the physical book 606, the augmented reality system can continue to update or re-render the virtual graphic overlay 608 to approximate the reading progress of the user 112a through the corresponding augmented reality materials.

Figure 6B:
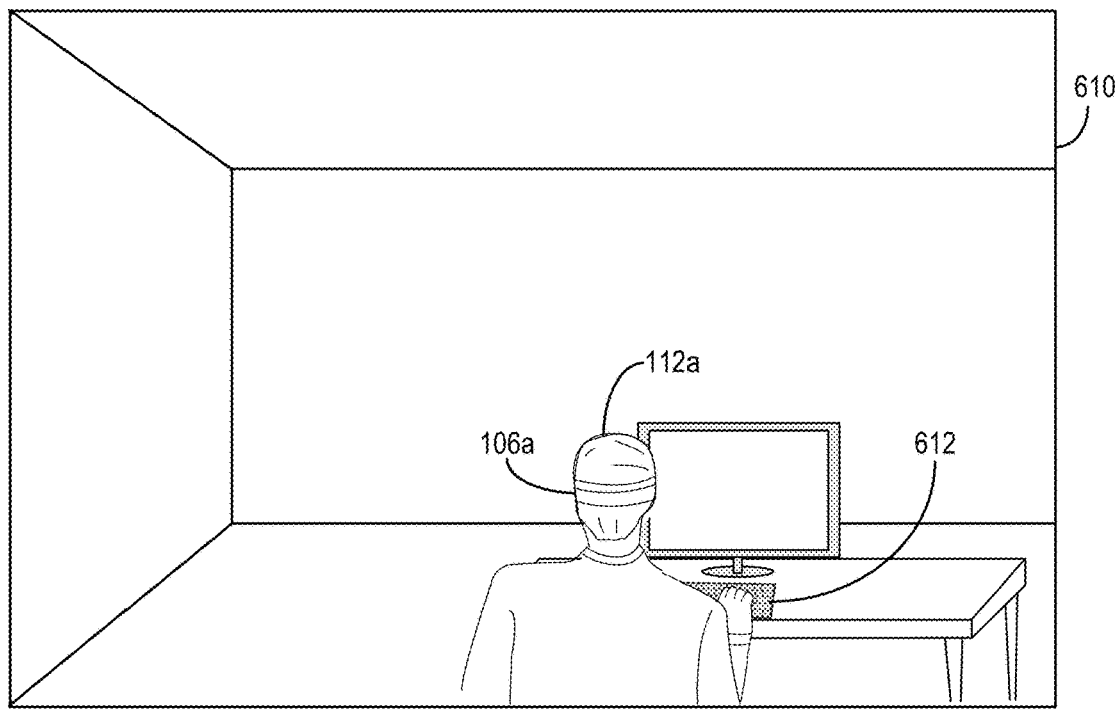
Figure 6C:
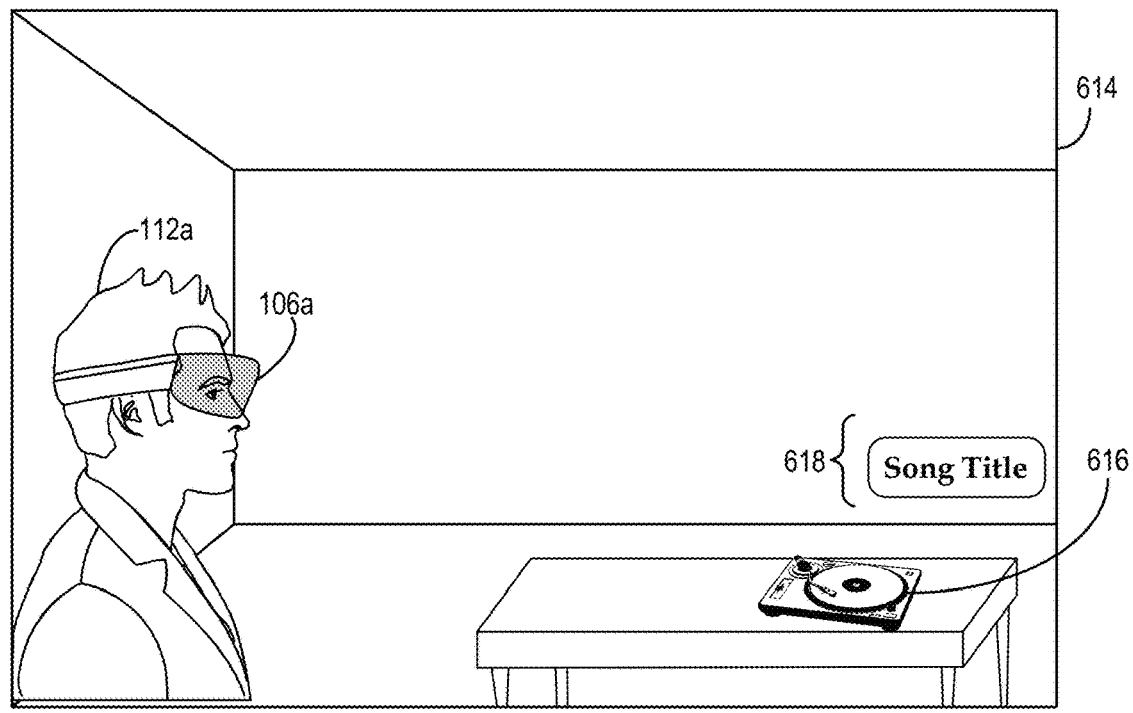

In one or more embodiments, the augmented reality system 102 can update or alter an augmented reality experience based on user interactions in connection with a physical object that corresponds to a virtual object in an augmented reality experience. For example, as shown in FIG. 6B, an augmented reality experience including the augmented reality experience 610 may include the user 112a typing input into a computer to further some goal of the augmented reality experience. In generating the augmented reality experience 610, the augmented reality system 102 may accordingly utilize SLAM to identify and localize a physical keyboard 612. The augmented reality system 102 may further determine that a virtual keyboard associated with the augmented reality experience 610 is analogous to the physical keyboard 612 and can anchor one or more features of the augmented reality experience based on this determination.

Once the features of the augmented reality experience are anchored to the physical keyboard 612, the augmented reality system 102 can update or modify aspects of the augmented reality experience 610 based on detecting user interactions with the physical keyboard 612. For example, as shown in FIG. 6B, the augmented reality system 102 can utilize motion tracking to detect the user 112a typing on the physical keyboard 612. Based on the detected user interactions, the augmented reality system 102 can generate a virtual graphical overlay (e.g., positioned over a physical computer monitor) or a virtual object (e.g., a virtual computing monitor) including letters or other symbols corresponding to the detected typing, or can update or modify other virtual objects in the augmented reality experience 610 based on the detected typing. Thus, the augmented reality system 102 can utilize detected typing on the physical keyboard 612 to further modify or update the augmented reality experience 610, even though the physical keyboard 612 is not physically connected to, or otherwise interfaced with, the augmented reality system 102 or any other computing system. In additional or alternative embodiments, the augmented reality system 102 can similarly track user interactions with other types of physical input devices such as, but not limited to, game controllers, computer mice, TV remote controllers, and touch screen displays.

In one or more embodiments, the augmented reality system 102 can further generate or modify acoustic or graphical features of an augmented reality experience based on a correspondence between a virtual object of the augmented reality experience and a physical object of the physical environment. For example, in FIG. 6C, an augmented reality experience 614 may comprise an augmented reality scene in which the user 112a can listen to music from a record player. In response to identifying a physical record player 616, the augmented reality system 102 can anchor both visual and acoustic features of the augmented reality experience 614 to the physical record player 616.

The augmented reality system 102 can also determine the sound profile associated with the physical record player 616 (e.g., the type and quality of music playback of which the physical record player 616 is capable). The augmented reality system 102 can then play music virtually utilizing the physical record player 616. For example, the augmented reality system 102 can modify the acoustic features (e.g., both the localization features and sound quality features) of the music to simulate that the music is being played by the physical record player 616.

Additionally, the augmented reality system 102 anchor graphical features of the augmented reality experience 614 to the physical record player 616. For example, the augmented reality system 102 can anchor graphical characteristics of the augmented reality experience 614 by generating a partial virtual graphic overlay 618 and positioning the partial virtual graphic overlay 618 over a portion of the physical record player 616. More specifically, the augmented reality system 102 can generate the partial virtual graphic overlay 618 to include hovering text indicating a song title associated with the music of the augmented reality experience 614, and a record that appears to be spinning on the physical record player 616. Accordingly, in this scenario, the augmented reality system 102 generates the augmented reality experience 614 to simulate music originating from the physical record player 616 while the physical record player 616 spins a record, even though there is nothing actually being played by the physical record player 616.

Figure 6D:
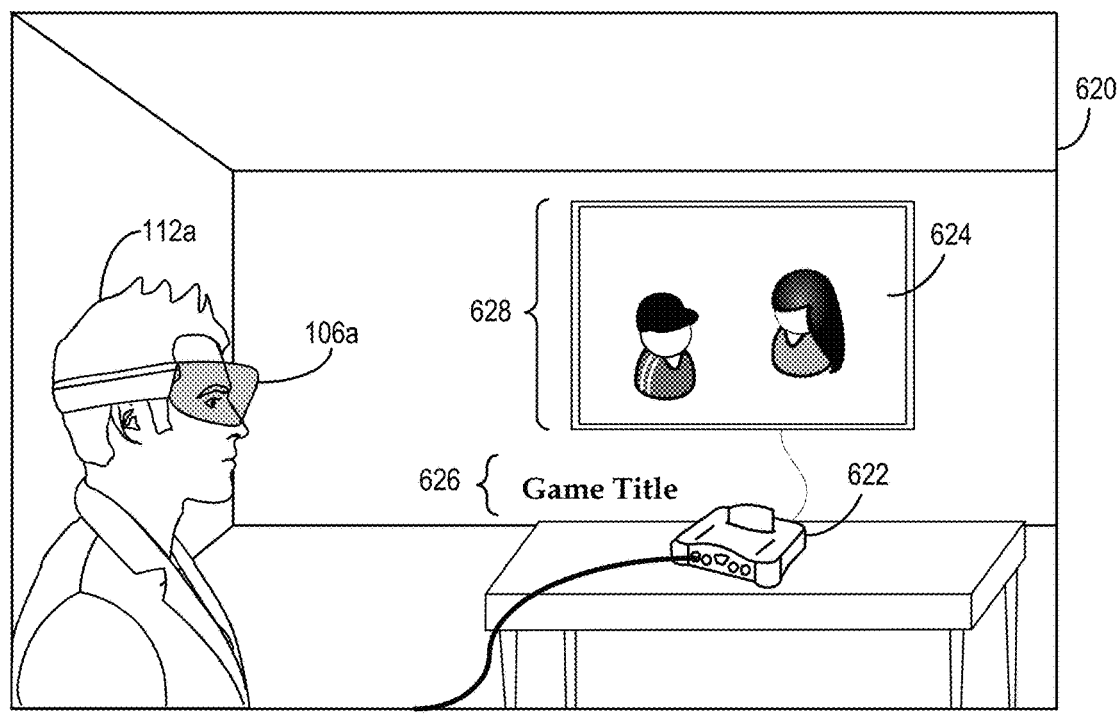

Similarly, the augmented reality system 102 can anchor additional graphical features of an augmented reality experience to additional physical objects in a physical environment. For example, as shown in FIG. 6D, an augmented reality experience may include an augmented reality experience 620 wherein the user 112a plays a video game on a physical game system (that may be disabled). For example, as shown in FIG. 6D, the user 112a may encounter a physical game console 622 that may no longer function (e.g., due to age or disrepair) connected to a physical screen display 624. In response to determining the type and capabilities of the physical game console 622, the augmented reality system 102 can anchor features of the augmented reality experience 620 to both the physical game console 622 and the physical screen display 624.

For instance, the augmented reality system 102 can generate and position the partial virtual graphic overlay 626, including hovering text detailing a game title and a portion of game cartridge, on a portion of the physical game console 622. The augmented reality system 102 can further generate a virtual graphic overlay 628 for a video display and position the virtual graphic overlay 628 on the physical screen display 624 to simulate that the video game is being played by the physical game console 622 and displayed by the physical screen display 624. As discussed above, the augmented reality system 102 can also track user interactions with a game controller so that the augmented reality system 102 can interface with a virtual machine ("VM") system, or similar, in order to accurately reflect the game play of the user 112a within the augmented reality experience 620.

Figure 6E:
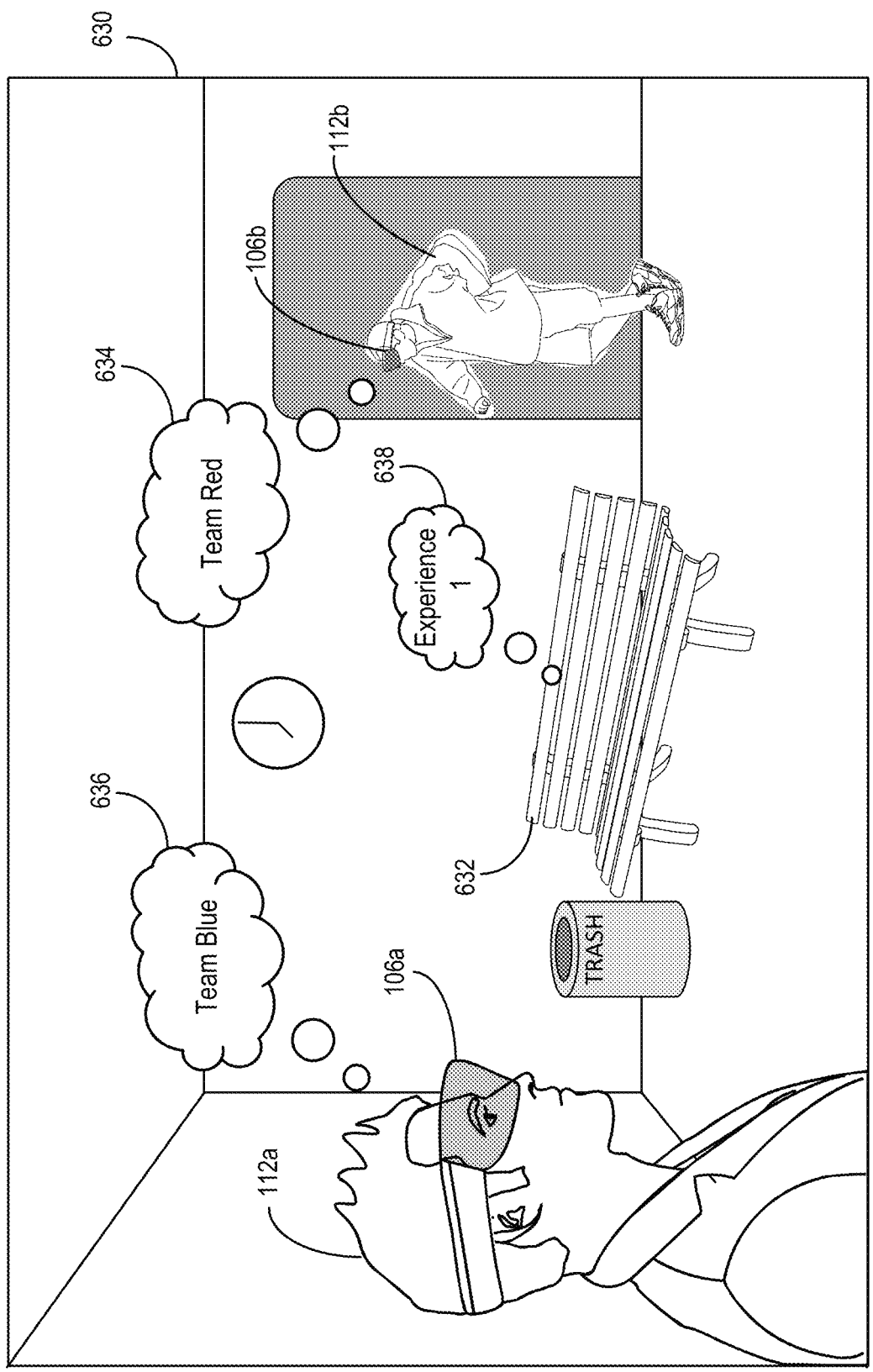

In one or more embodiments, the augmented reality system 102 can also generate interactive augmented reality experiences between two or more users within a physical environment. For example, as shown in FIG. 6E, an augmented reality experience may include users sharing an interactive experience with shared augmented reality experiences. As shown in FIG. 6E, the users 112a and 112b may be located in a physical train station. Each of the users 112a and 112b may be viewing an augmented reality experience 630 at the same time. In one or more embodiments, based on both the augmented-reality-computing device 106a and the augmented-reality-computing device 106b being within the same geographic area, the augmented reality system 102, via the augmented-reality-computing device 106a can utilize SLAM, BLUETOOTH, Wi-Fi, or a similar network connection, to detect the augmented-reality-computing device 106b, and/or vice versa.

In response to determining that both the augmented-reality-computing devices 106a and 106b are generating the augmented reality experience 630 for the same or shared augmented reality experience, the augmented reality system 102 can generate and position virtual objects as part of the augmented reality experience. As shown in FIG. 6E, for example, the augmented reality system 102 generates a virtual message 634 for display on the augmented-reality-computing device 106a to identify the user 112b as a co-user within an augmented reality experience 630. The augmented reality system 102 can also generate a virtual message 636 for display on the augmented-reality-computing device 106b to identify the user 106a as a co-user within the augmented reality experience 630. For example, the augmented reality system 102 can generate the virtual messages 634 and 636 either at a central server or through a shared link between the augmented-reality-computing devices 106a and 106b.

Furthermore, the augmented reality system 102 can generate a virtual message 638 for display by both the augmented-reality-computing devices 106a and 106b. In some cases, the virtual message 638 indicates a physical location or physical object as part of the same or shared augmented reality experience. For instance, in some embodiments, the augmented-reality-computing devices 106a and 106b can respectively detect interactions by the users 112a and 112b with the virtual message 638—and generate additional virtual objects—as the users 112a and 112b cooperatively work their way through the same or shared augmented reality experience.

Figure 7:
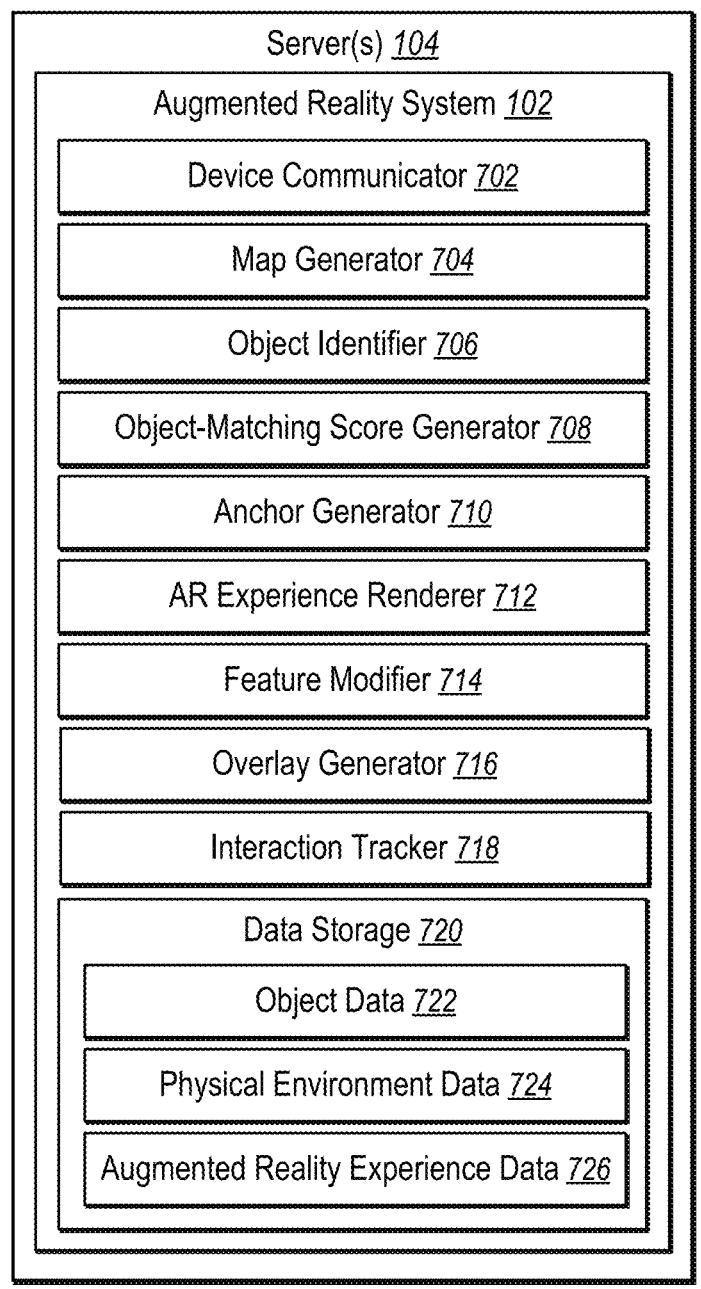
FIG. 7 illustrates a schematic diagram of an augmented reality system in accordance with one or more embodiments.

FIG. 7 illustrates a detailed schematic diagram of an embodiment of the augmented reality system 102 described above. In one or more embodiments, the augmented reality system 102 includes a device communicator 702, a map generator 704, an object identifier 706, an object-matching score generator 708, an anchor generator 710, a AR experience renderer 712, a feature modifier 714, an overlay generator 716, an interaction tracker 718, and a data storage 720 including object data 722, physical environment data 724, and augmented reality experience data 726.

As discussed above, the augmented reality system 102 can be hosted by a server (e.g., the server(s) 104 as shown in FIG. 1) or can reside on any of the augmented-reality-computing devices 106a and 106b. For example, if hosted by a server, the augmented reality system 102 can communicate with the augmented-reality-computing devices 106a and 106b to receive image streams and other environmental sensor data, and to provide renderings or rendering instructions for augmented reality experiences including virtual objects. If the augmented reality system 102 is contained by the augmented-reality-computing device 106a, the functionality of the augmented reality system 102 may be wholly contained by the augmented-reality-computing device 106a. Additionally or alternatively, the parts of the functionality of the augmented reality system 102 may be hosted by a server, while other parts of the functionality of the augmented reality system 102 may be performed by the augmented-reality-computing device 106a.

As shown in FIG. 7, and as mentioned above, the augmented reality system 102 can include the device communicator 702. In one or more embodiments, the device communicator 702 handles communications between the augmented reality system 102 and the augmented-reality-computing device 106a—if the augmented reality system 102 is not located on the augmented-reality-computing device 106a. For example, the device communicator 702 can capture an image stream of a physical environment from the augmented-reality-computing device 106a. The device communicator 702 can also receive environmental sensor information from the augmented-reality-computing device 106a indicating a position, location, movement, etc. of the augmented-reality-computing device 106a. The device communicator 702 can further provide augmented reality experiences and/or rendering instructions for augmented reality experiences to the augmented-reality-computing device 106a.

Additionally, the device communicator 702 can handle communications between two or more augmented-reality-computing devices 106a and 106b. For example, in a scenario where two users 112a and 112b are cooperating within an augmented reality experience toward a common goal, the device communicator 702 can communicate information between the augmented-reality-computing devices 106a and 106b. In one or more embodiments, the device communicator 702 can communicate positional information, image stream information, and other environmental sensor information between the augmented-reality-computing devices 106a and 106b.

As shown in FIG. 7, and as mentioned above, the augmented reality system 102 also includes the map generator 704. In one or more embodiments, the map generator 704 utilizes the SLAM system, or any other appropriate mapping system, to map a physical environment relative to the augmented-reality-computing device 106a. For example, the map generator 704 can utilize SLAM to extract features of the physical environment and determine objects within the physical environment. The map generator 704 can further determine relative distances and angles between the features and objects of the physical environment and the augmented-reality-computing device 106a. Based on all this information, the map generator 704 can generate a three-dimensional map of the physical environment and localize the augmented-reality-computing device 106a within the physical environment.

In one or more embodiments, the map generator 704 can further update the location of the augmented-reality-computing device 106a. For example, based on movement signals received from the augmented-reality-computing device 106a (e.g., from a gyroscope, an accelerometer, an image stream), the map generator 704 can calculate an updated location of the augmented-reality-computing device 106a within the three-dimensional map of the physical environment. The map generator 704 can further update the relative distances and locations of the physical objects from the augmented-reality-computing device 106a based on the movement signals.

As mentioned above, and as shown in FIG. 7, the augmented reality system 102 includes the object identifier 706. In one or more embodiments, the object identifier 706 identifies the one or more physical objects within a physical environment. For example, the object identifier 706 can receive an indication of a physical object from the map generator 704 and can utilize image analysis and other detection methods to determine what the indicated physical object actually is. In at least one embodiment, the object identifier 706 can utilize heat maps, machine learning, image comparison, or any other suitable technique to identify physical objects in the physical environment.

In one or more embodiments, the object identifier 706 further determines a type or classification for each identified physical object. For example, if the object identifier 706 determines that a physical object is a lamp, the object identifier 706 can further determine that the lamp can be classified as furniture, as décor, as living room furniture, etc. In at least one embodiment, the object identifier 706 can determine the type or classification of an identified physical object based on a web lookup, a database lookup, machine learning, or other data repository techniques.

In response to determining the type or classification of the physical object, the object identifier 706 can further determine features and characteristics of the physical object. For example, in response to identifying the lamp and determining that it is furniture, the object identifier 706 can further determine that features and characteristics of the lamp include that it is stationary, that it emits light when turned on, that it has a specific size, that certain interaction (e.g., being switched on and off) effect its appearance, and so forth. In at least one embodiment, the object identifier 706 can determine the features and characteristics of the physical object based on machine learning, data lookups, or any other appropriate technique.

In one or more embodiments, the object identifier 706 can similarly identify and classify virtual objects in an augmented reality experience. For example, in response to a selection or other indication of an augmented reality experience (e.g., as selected by the user 112*a*, or as dictated by the present augmented reality experience), the object identifier 706 can retrieve or otherwise identify the virtual objects required by the augmented reality experience. For instance, the object identifier 706 can retrieve the required virtual objects as three-dimensional image files or other virtual object models from a location included in rendering instructions associated with the augmented reality experience. For each identified virtual object, the object identifier 706 can utilize machine learning, data lookups, image analysis, or any other appropriate technique to determine the features and characteristics of the virtual object.

As shown in FIG. 7, and as mentioned above, the augmented reality system 102 includes the object-matching score generator 708. In one or more embodiments, the object-matching score generator 708 calculates an object-matching score indicating a degree to which one or more characteristics (e.g., physical appearance-based characteristics, functionality characteristics, acoustic characteristics) of a physical object of a physical environment match one or more characteristics of a virtual object of an augmented reality experience. For example, in response to determining the characteristics of an identified physical object and identifying the virtual objects associated with an augmented reality experience, the object-matching score generator 708 can calculate an object-matching score for between the physical object and each of the identified virtual objects.

In at least one embodiment, the object-matching score generator 708 calculates the object-matching score associated with the physical object and a particular virtual object by identifying matches (e.g., character string matches, threshold matches) between the characteristics of the physical object and characteristics of the particular virtual object. For each identified match, the object-matching score generator 708 can add a value or point to a total score for the object pair. Additionally, the object-matching score generator 708 can further weight the value or point based on the relevancy of the matched characteristics. For example, if the matched characteristics indicate an appearance similarity between the objects and/or a functionality similarity between the objects, the object-matching score generator 708 can add a weight to the value of point added to the total score for the object pair.

After calculating object-matching scores for every combination of physical objects in the physical environment and virtual objects in the augmented reality experience, the object-matching score generator 708 can identify analogous virtual objects. For example, for a particular physical object in the physical environment, the object-matching score generator 708 can identify the highest object-matching score associated with that physical object. The object-matching score generator 708 can further determine that the virtual object associated with that high score is analogous to the physical object. In at least one embodiment, the object-matching score generator 708 can determine that the virtual object is analogous to the physical object when the object-matching score associated with both is highest and when that score is satisfies an object-matching threshold. The object-matching score generator 708 can repeat this process for every physical object identified in the physical environment.

As shown in FIG. 7, and as mentioned above, the augmented reality system 102 also includes the anchor generator 710. In one or more embodiments, the anchor generator 710 anchors one or more features of an augmented reality experience to a physical object determined to correspond to an analogous virtual object of the augmented reality experience. For example, the anchor generator 710 can identify visual and acoustic features of an augmented reality experience based on an analysis of rendering and playback instructions associated with the augmented reality experience.

To illustrate, if the augmented reality experience is one where the user is only meant to listen to music, the anchor generator 710 can identify acoustic features of the music (e.g., the music file for playing, preset playback levels, sound distortions and enhancements). The anchor generator 710 can further anchor those acoustic features to the physical object by associating those features with a location of the physical object, as indicated by the three-dimensional map of the physical environment. The anchor generator 710 can repeat this process with other types of features associated with the augmented reality experience.

As shown in FIG. 7, and as mentioned above, the augmented reality system 102 also includes the AR experience renderer 712. In one or more embodiments, the AR experience renderer 712 generates an augmented reality experience for display via the augmented-reality-computing device 106*a*. For example, the AR experience renderer 712 can access rendering instructions associated with the augmented reality experience to render virtual objects including texture, lighting, and shading according to the positioning of the virtual objects within the augmented reality experience.

As further shown in FIG. 7, and as mentioned above, the augmented reality system 102 includes the feature modifier 714. In one or more embodiments, the feature modifier 714 modifies one or more features of an augmented reality experience based on those features being anchored to a particular physical object within the physical environment. For example, the feature modifier 714 can modify acoustic features of a sound of the augmented reality experience to simulate that the sound originates from the physical object. Additionally or alternatively, the feature modifier 714 can modify the acoustic features of the sound to simulate an effect on the sound by the physical object. Additionally or alternatively, the feature modifier 714 can modify or consolidate audio streams of the sound based on the acoustic features being anchored to the physical object. Additionally or alternatively, the feature modifier 714 can modify the acoustic features of the sound based on a sound profile of the analogous virtual object. As discussed above, the feature modifier 714 can modify the acoustic features of the sound based on: a distance between a location of the physical object and the augmented-reality-computing device 106*a*, spectral localization cues from the location of the physical object relative to the augmented-reality-computing device 106*a*, and/or a visual characteristic of the physical object.

As mentioned above, and as shown in FIG. 7, the augmented reality system 102 includes the overlay generator 716. In one or more embodiments, the overlay generator 716 identifies one or more visual characteristics of an analogous virtual object and generates a virtual graphic overlay based on the identified visual characteristics. In at least one embodiment, the overlay generator 716 further provides the generated virtual graphic overlay to the AR experience renderer 712 for inclusion in the augmented reality experience along with rendering instructions to superimpose the virtual graphic overlay at a position that overlays a portion of the corresponding physical object or over the entire corresponding physical object. In additional or alternative embodiments, the overlay generator 716 can generate updated or new virtual graphic overlays based on detected user interactions.

As shown in FIG. 7, and as mentioned above, the augmented reality system 102 includes an interaction tracker 718. In one or more embodiments, the interaction tracker 718 detects and tracks user interactions with virtual graphic overlays and physical objects. For example, the interaction tracker 718 can detect user interactions with a virtual graphic overlay, with an area of a physical object on which the virtual graphic overlay is superimposed, and/or with the physical object with no virtual graphic overlay superimposed. Based on the detected user interactions, the interaction tracker 718 can request additional modifications be performed by the feature modifier 714.

As further shown in FIG. 7, the augmented reality system 102 includes the data storage 720 including the object data 722, the physical environment data 724, and the augmented reality experience data 726. In one or more embodiments, the object data 722 includes information associated with physical objects and/or virtual objects such as described herein (e.g., identifications, types, classifications, features, characteristics). In one or more embodiments, the physical environment data 724 includes information associated with physical environments such as described herein (e.g., 3D maps, localizations, relative distances, anchors). In one or more embodiments, the augmented reality experience data 726 includes information associated with augmented reality experiences such as described herein (e.g., required virtual objects, associated augmented reality experience, positions, sounds).

Each of the components 702-726 of the augmented reality system 102 can include software, hardware, or both. For example, the components 702-726 can include one or more instructions stored on a computer-readable storage medium and executable by processors of one or more computing devices, such as a client device or server device. When executed by the one or more processors, the computer-executable instructions of the augmented reality system 102 can cause the computing device(s) to perform the methods described herein. Alternatively, the components 702-726 can include hardware, such as a special-purpose processing device to perform a certain function or group of functions. Alternatively, the components 702-726 of the augmented reality system 102 can include a combination of computer-executable instructions and hardware.

Furthermore, the components 702-726 of the augmented reality system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-726 may be implemented as a stand-alone application, such as a desktop or mobile application. Furthermore, the components 702-726 may be implemented as one or more web-based applications hosted on a remote server. The components 702-726 may also be implemented in a suite of mobile device applications or "apps."

Figure 8:
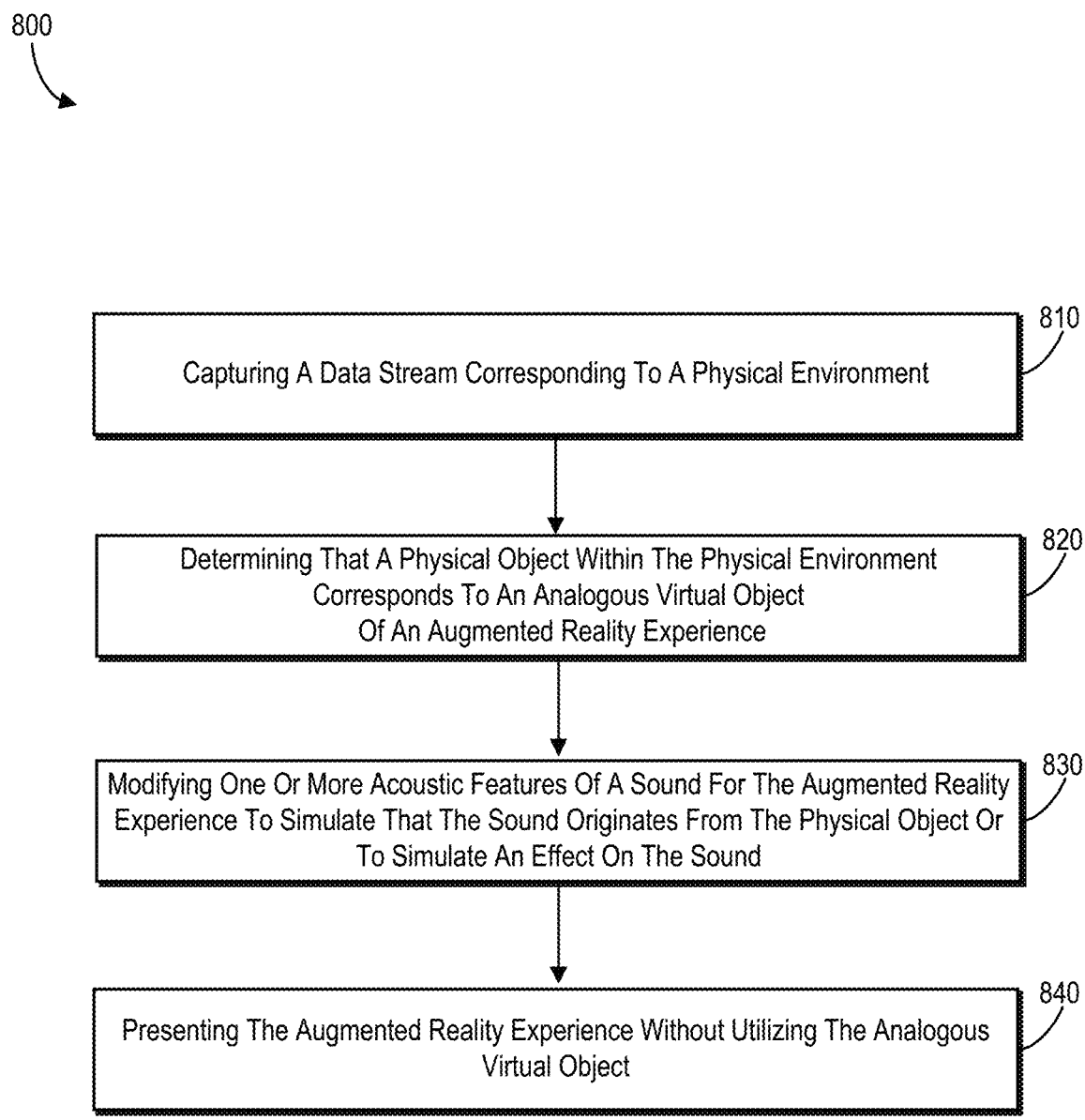
FIG. 8 illustrates a flowchart of a series of acts for determining a physical object from a physical environment corresponds to an analogous virtual object for an augmented reality experience and modifying acoustic features of a sound for the augmented reality experience to integrate the physical object into the augmented reality experience in accordance with one or more embodiments.

FIGS. 1-7, the corresponding text, and the examples provide a number of different methods, systems, devices, and non-transitory computer-readable media of the augmented reality system 102. In addition to the foregoing, one or more embodiments can also be described in terms of flowcharts comprising acts for accomplishing a particular result, as shown in FIG. 8. FIG. 8 may be performed with more or fewer acts. Further, the acts may be performed in differing orders. Additionally, the acts described herein may be repeated or performed in parallel with one another or parallel with different instances of the same or similar acts.

In accordance with one or more embodiments, FIG. 8 illustrates a flowchart of a series of acts 800 for determining a physical object from a physical environment corresponds to an analogous virtual object for an augmented reality experience and modifying acoustic features of a sound for the augmented reality experience to integrate the physical object into the augmented reality experience. While FIG. 8 illustrates acts according to one embodiment, alternative embodiments may omit, add to, reorder, and/or modify any of the acts shown in FIG. 8. The acts of FIG. 8 can be performed as part of a method. Alternatively, a non-transitory computer-readable medium can comprise instructions that, when executed by one or more processors, cause a computing device to perform the acts of FIG. 8. In some embodiments, a system can perform the acts of FIG. 8.

As shown in FIG. 8, the series of acts 800 includes an act 810 of capturing a data stream corresponding to a physical environment. For example, the act 810 can involve capturing a data stream corresponding to a physical environment utilizing an augmented-reality-computing device. As further shown in FIG. 8, the series of acts 800 includes an act 820 of determining that a physical object within the physical environment corresponds to an analogous virtual object of an augmented reality experience. For example, determining that the physical object within the physical environment corresponds to the analogous virtual object of an augmented reality experience can be based on image comparisons, description comparisons, heat maps, and/or machine learning. In one or more embodiments, determining that the physical object within the physical environment corresponds to the analogous virtual object of the augmented reality experience includes: generating an object-matching score indicating a degree to which one or more characteristics of the physical object match one or more characteristics of the analogous virtual object; and determining the object-matching score satisfies an object-matching threshold.

As shown in FIG. 8, the series of acts 800 includes an act 830 of modifying one or more acoustic features of a sound for the augmented reality experience to simulate that the sound originates from the physical object or to simulate an effect on the sound. For example, the act 830 can involve modifying, by the augmented-reality-computing device, one or more acoustic features of a sound for the augmented reality experience to simulate that the sound originates from the physical object or to simulate an effect on the sound by the physical object. In at least one embodiment, the series of acts 800 further includes mapping the physical environment to determine a location of the physical object relative to the augmented-reality-computing device. For example, modifying the one or more acoustic features of the sound can include modifying the sound to simulate the sound originating from the location of the physical object relative to the augmented-reality-computing device.

In one or more embodiments, modifying the one or more acoustic features of the sound can include one or more of: modifying an acoustic feature of the sound based on a distance between a location of the physical object and the augmented-reality-computing device; modifying the acoustic feature of the sound based on spectral localization cues from the location of the physical object relative to the augmented-reality-computing device; or modifying the acoustic feature of the sound based on a visual characteristic of the physical object. In at least one embodiment, modifying the one or more acoustic features of the sound includes one or more of: modifying one or more audio streams corresponding to the sound for the augmented reality experience; or consolidating two or more audio streams corresponding to the sound for the augmented reality experience. For example, modifying the one or more acoustic features of the sound can include: identifying a sound profile associated with the analogous virtual object; and modifying an acoustic feature of the sound based on the sound profile associated with the analogous virtual object.

As shown in FIG. 8, the series of acts 800 includes an act 840 of presenting the augmented reality experience without utilizing the analogous virtual object. For example, the act 840 can involve presenting, by the augmented-reality-computing device, the augmented reality experience without utilizing the analogous virtual object. For example, presenting the augmented reality experience without utilizing the analogous virtual object can include rendering the augmented reality experience utilizing the physical object instead of the analogous virtual object.

In one or more embodiments, the series of acts 800 includes acts of: identifying a visual characteristic of the analogous virtual object; generating a virtual graphic overlay based on the visual characteristic; and presenting the augmented reality experience by superimposing the virtual graphic overlay over a portion of the physical object or over an entirety of the physical object. In at least one embodiment, the series of acts 800 includes: detecting a user interaction with an area of the physical object on which the virtual graphic overlay is superimposed; generating a new virtual graphic overlay based on the user interaction; and rendering the new virtual graphic overlay superimposed over the portion of the physical object or over the entirety of the physical object.

Additionally, in one or more embodiments, the series of acts 800 includes: identifying that the sound corresponds to an additional virtual object from the augmented reality experience; identifying a sound effect for the sound based on the analogous virtual object; determining a physical characteristic of the physical object; and modifying the one or more acoustic features of the sound to simulate the sound effect based on the physical characteristic of the physical object. For example, the series of acts 800 can further include determining the physical characteristic of the physical object by determining one or more of: a thickness of the physical object, a mass of the physical object, a size of the physical object, a shape of the physical object, or a density of the physical object. The series of acts 800 can also include determining that the physical object displays one or more images or produces audio.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
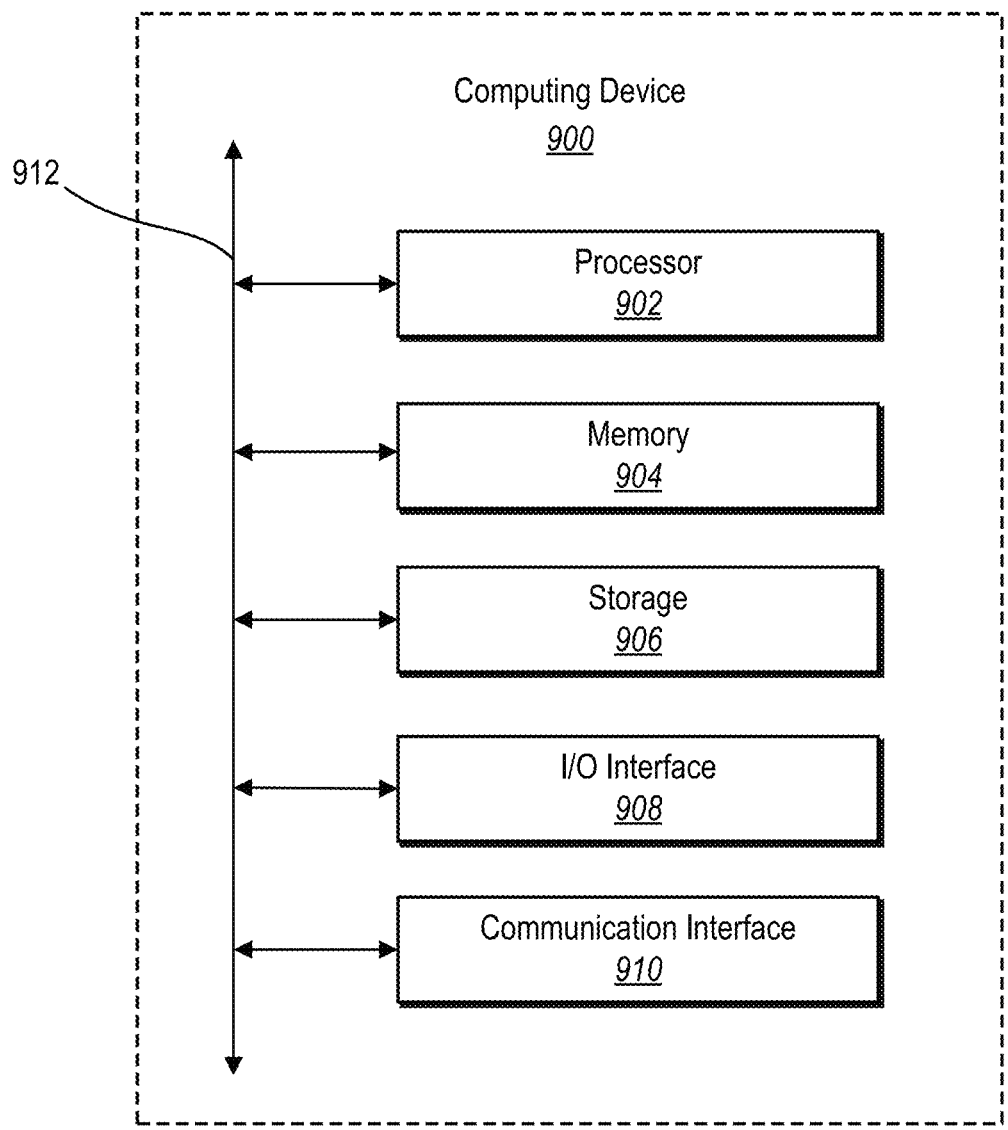
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the augmented reality system 102. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the augmented reality system 102 can be implemented as part of (or including) a networking system. In one or more embodiments, the networking system comprises a social networking system. In addition to the description given above, a social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 10:
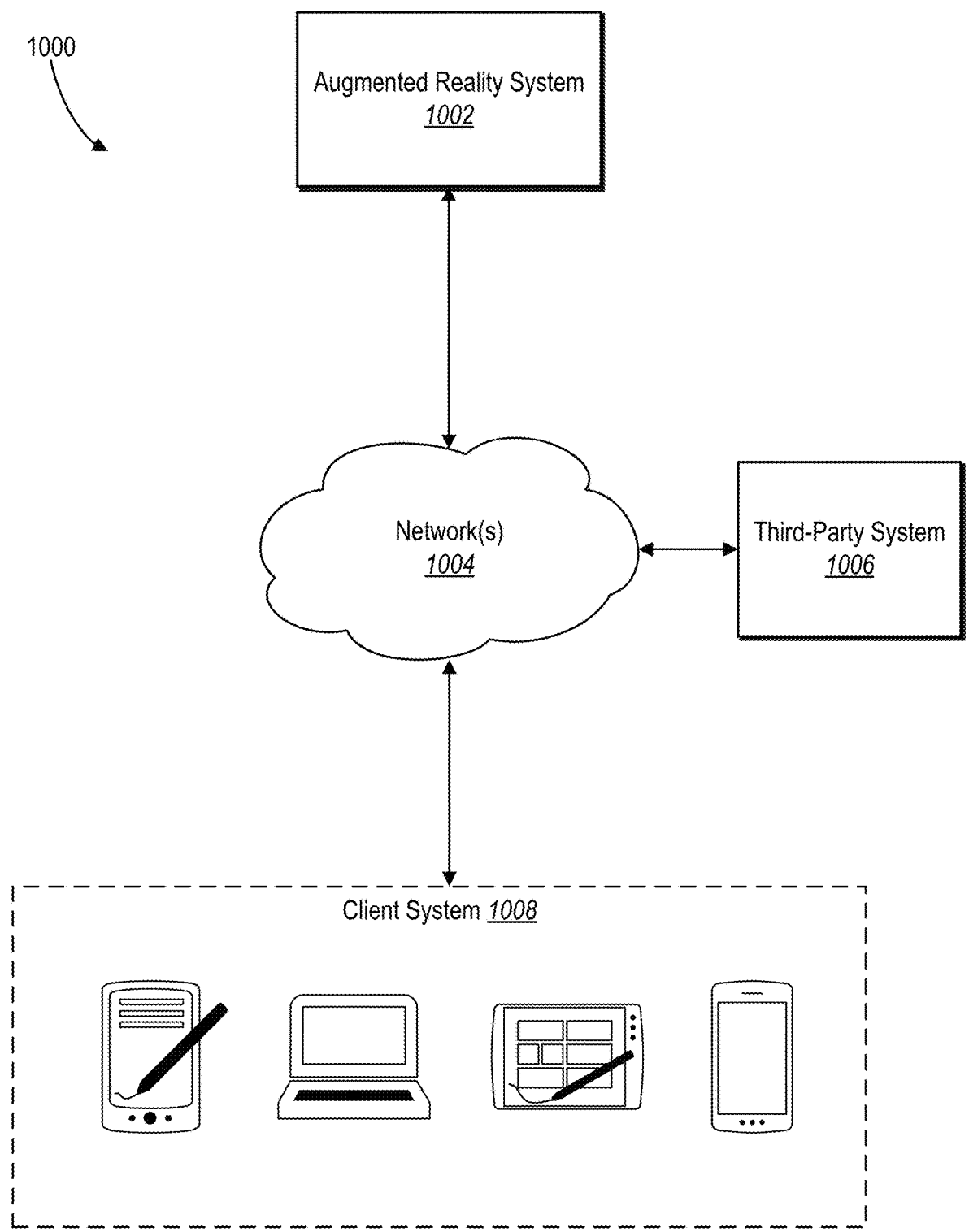
FIG. 10 is an example network environment of an augmented reality system in accordance with one or more embodiments.

FIG. 10 illustrates an example network environment 1000 of an augmented reality system. Network environment 1000 includes a client system 1008, an augmented reality system 1002 (e.g., the augmented reality system 102), and a third-party system 1006 connected to each other by a network 1004. Although FIG. 10 illustrates a particular arrangement of the client system 1008, augmented reality system 1002, third-party system 1006, and network 1004, this disclosure contemplates any suitable arrangement of the client system 1008, augmented reality system 1002, third-party system 1006, and network 1004. As an example and not by way of limitation, two or more of client system 1008, augmented reality system 1002, and third-party system 1006 may be connected to each other directly, bypassing network 1004. As another example, two or more of the client system 1008, augmented reality system 1002, and third-party system 1006 may be physically or logically co-located with each other in whole or in part. Moreover, although FIG. 10 illustrates a particular number of client systems 1008, networking systems 1002, third-party systems 1006, and networks 1004, this disclosure contemplates any suitable number of client systems 1008, augmented reality system 1002, third-party systems 1006, and networks 1004. As an example and not by way of limitation, network environment 1000 may include multiple client systems 1008, augmented reality systems 1002, third-party systems 1006, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect the client system 1008, augmented reality system 1002, and third-party system 1006 to communication network 1004 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, the client system 1008 may be an electronic device including hardware, software, or embedded logic components or a combination of two or more such components and capable of carrying out the appropriate functionalities implemented or supported by the client system 1008. As an example and not by way of limitation, a client system 1008 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 1008. A client system 1008 may enable a network user at the client system 1008 to access network 1004. A client system 1008 may enable its user to communicate with other users at other client devices 1008.

In particular embodiments, the client system 1008 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client system 1008 may enter a Uniform Resource Locator (URL) or other address directing the web browser to a particular server (such as server, or a server associated with a third-party system 1006), and the web browser may generate a Hyper Text Transfer Protocol (HTTP) request and communicate the HTTP request to server. The server may accept the HTTP request and communicate to the client system 1008 one or more Hyper Text Markup Language (HTML) files responsive to the HTTP request. The client system 1008 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, augmented reality system 1002 may be a network-addressable computing system that can host an online augmented reality system. Augmented reality system 1002 may generate, store, receive, and send augmented reality data, such as, for example, augmented reality scenes, augmented reality experiences, virtual objects, or other suitable data related to the augmented reality system 1002. Augmented reality system 1002 may be accessed by the other components of network environment 1000 either directly or via network 1004. In particular embodiments, augmented reality system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, augmented reality system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client system 1008, an augmented reality system 1002, or a third-party system 1006 to manage, retrieve, modify, add, or delete, the information stored in data store.

In particular embodiments, augmented reality system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Augmented reality system 1002 may provide users of the online social network the ability to communicate and interact with other users. In particular embodiments, users may join the online social network via augmented reality system 1002 and then add connections (e.g., relationships) to a number of other users of augmented reality system 1002 that they want to be connected to. Herein, the term "friend" may refer to any other user of augmented reality system 1002 with whom a user has formed a connection, association, or relationship via augmented reality system 1002.

In particular embodiments, augmented reality system 1002 may provide users with the ability to take actions on various types of items or objects, supported by augmented reality system 1002. As an example and not by way of limitation, the items and objects may include groups or social networks to which users of augmented reality system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in augmented reality system 1002 or by an external system of third-party system 1006, which is separate from augmented reality system 1002 and coupled to augmented reality system 1002 via a network 1004.

In particular embodiments, augmented reality system 1002 may be capable of linking a variety of entities. As an example and not by way of limitation, augmented reality system 1002 may enable users to interact with each other as well as receive content from third-party systems 1006 or other entities, or to allow users to interact with these entities through an application programming interfaces (API) or other communication channels.

In particular embodiments, a third-party system 1006 may include one or more types of servers, one or more data stores, one or more interfaces, including but not limited to APIs, one or more web services, one or more content sources, one or more networks, or any other suitable components, e.g., that servers may communicate with. A third-party system 1006 may be operated by a different entity from an entity operating augmented reality system 1002. In particular embodiments, however, augmented reality system 1002 and third-party systems 1006 may operate in conjunction with each other to provide social-networking services to users of augmented reality system 1002 or third-party systems 1006. In this sense, augmented reality system 1002 may provide a platform, or backbone, which other systems, such as third-party systems 1006, may use to provide social-networking services and functionality to users across the Internet.

In particular embodiments, a third-party system 1006 may include a third-party content object provider. A third-party content object provider may include one or more sources of content objects, which may be communicated to a client system 1008. As an example, and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, augmented reality system 1002 also includes user-generated content objects, which may enhance a user's interactions with augmented reality system 1002. User-generated content may include anything a user can add, upload, send, or "post" to augmented reality system 1002. As an example and not by way of limitation, a user communicates posts to augmented reality system 1002 from a client system 1008. Posts may include data such as status updates or other textual data, location information, photos, videos, links, music or other similar data or media. Content may also be added to augmented reality system 1002 by a third-party through a "communication channel," such as a newsfeed or stream.

In particular embodiments, augmented reality system 1002 may include a variety of servers, sub-systems, programs, modules, logs, and data stores. In particular embodiments, augmented reality system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Augmented reality system 1002 may also include suitable components such as network interfaces, security mechanisms, load balancers, failover servers, management-and-network-operations consoles, other suitable components, or any suitable combination thereof. In particular embodiments, augmented reality system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking augmented reality system 1002 to one or more client system 1008 or one or more third-party system 1006 via network 1004. The web server may include a mail server or other messaging functionality for receiving and routing messages between augmented reality system 1002 and one or more client systems 1008. An API-request server may allow a third-party system 1006 to access information from augmented reality system 1002 by calling one or more APIs. An action logger may be used to receive communications from a web server about a user's actions on or off augmented reality system 1002. In conjunction with the action log, a third-party-content-object log may be maintained of user exposures to third-party-content objects. A notification controller may provide information regarding content objects to a client system 1008. Information may be pushed to a client system 1008 as notifications, or information may be pulled from client system 1008 responsive to a request received from client system 1008. Authorization servers may be used to enforce one or more privacy settings of the users of augmented reality system 1002. A privacy setting of a user determines how particular information associated with a user can be shared. The authorization server may allow users to opt in to or opt out of having their actions logged by augmented reality system 1002 or shared with other systems (e.g., third-party system 1006), such as, for example, by setting appropriate privacy settings. Third-party-content-object stores may be used to store content objects received from third parties, such as a third-party system 1006. Location stores may be used for storing location information received from client system 1008 associated with users. Advertisement-pricing modules may combine social information, the current time, location information, or other suitable information to provide relevant advertisements, in the form of notifications, to a user.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   capturing a data stream corresponding to a physical environment utilizing an augmented-reality-computing device;
   identifying a physical object within the physical environment that corresponds to an analogous virtual object of an augmented reality experience;
   analyzing the analogous virtual object within the augmented reality experience to determine a function of one or more acoustic features of the analogous virtual object;
   modifying, by the augmented-reality-computing device, one or more acoustic features of a sound for the augmented reality experience based on the function of one or more acoustic features of the analogous virtual object to simulate that the sound for the augmented reality experience originates from a location of the physical object;
   modifying, by the augmented-reality-computing device, one or more visual features of the augmented reality experience by applying a visual overlay to the location of the physical object; and
   presenting, by the augmented-reality-computing device, the augmented reality experience with the modified one or more acoustic features and the analogous visual object.

2. The computer-implemented method as recited in claim 1, further comprising:
   mapping the physical environment to determine a location of the physical object relative to the augmented-reality-computing device, wherein the augmented-reality-computing device comprises a mixed reality headset; and
   wherein modifying the one or more acoustic features of the sound for the augmented reality experience comprises modifying the sound for the augmented reality experience to simulate the sound originating from the location of the physical object relative to the augmented-reality-computing device.

3. The computer-implemented method as recited in claim 1, further comprising modifying the one or more acoustic features of the sound for the augmented reality experience by performing one or more of: modifying an acoustic feature of the sound for the augmented reality experience based on a distance between the location of the physical object and the augmented-reality-computing device; modifying the acoustic feature of the sound for the augmented reality experience based on spectral localization cues from the location of the physical object relative to the augmented-reality-computing device; or modifying the acoustic feature of the sound for the augmented reality experience based on a visual characteristic of the physical object.

4. The computer-implemented method as recited in claim 1, further comprising modifying the one or more acoustic features of the sound for the augmented reality experience by performing one or more of:
   modifying one or more audio streams corresponding to the sound for the augmented reality experience; or
   consolidating two or more audio streams corresponding to the sound for the augmented reality experience.

5. The computer-implemented method as recited in claim 4, further comprising modifying the one or more acoustic features of the sound for the augmented reality experience by:
   identifying a sound profile associated with the analogous virtual object; and
   modifying an acoustic feature of the sound for the augmented reality experience based on the sound profile associated with the analogous virtual object.

6. The computer-implemented method as recited in claim 1, further comprising:
   identifying a visual characteristic of the analogous virtual object;
   generating a virtual graphic overlay based on the visual characteristic; and
   presenting the augmented reality experience by superimposing the virtual graphic overlay over a portion of the physical object or over an entirety of the physical object.

7. The computer-implemented method as recited in claim 6, further comprising:
   detecting a user interaction with the location of the physical object on which the virtual graphic overlay is superimposed;
   generating a new virtual graphic overlay based on the user interaction with the location of the physical object; and
   rendering the new virtual graphic overlay superimposed over the portion of the physical object or over the entirety of the physical object.

8. The computer-implemented method as recited in claim 1, further comprising:
   identifying that the sound for the augmented reality experience corresponds to an additional virtual object from the augmented reality experience;
   identifying a sound effect for the sound based on the analogous virtual object;
   determining a physical characteristic of the physical object; and
   modifying the one or more acoustic features of the sound to simulate the sound effect based on the physical characteristic of the physical object.

9. The computer-implemented method as recited in claim 8, wherein determining the physical characteristic of the physical object comprises determining one or more of: a thickness of the physical object, a mass of the physical object, a size of the physical object, a shape of the physical object, or a density of the physical object.

10. The computer-implemented method as recited in claim 1, wherein determining that the physical object within the physical environment corresponds to the analogous virtual object of the augmented reality experience comprises:
   generating an object-matching score indicating a degree to which one or more characteristics of the physical object match one or more characteristics of the analogous virtual object; and
   determining the object-matching score satisfies an object-matching threshold.

11. A system comprising:
   at least one processor; and
   at least one non-transitory computer-readable storage medium storing instructions thereon that, when executed by the at least one processor, cause the system to:
   capture a data stream corresponding to a physical environment utilizing an augmented-reality-computing device;
   identify that a physical object within the physical environment that corresponds to an analogous virtual object of an augmented reality experience;
   analyze the analogous virtual object within the augmented reality experience to determine a function of one or more acoustic features of the analogous virtual object;
   modifying, by the augmented-reality-computing device, one or more acoustic features of a sound for the augmented reality experience based on the function of one or more acoustic features of the analogous virtual object to simulate that the sound for the augmented reality experience originates from a location of the physical object;
   modifying, by the augmented-reality-computing device, one or more visual features of the augmented reality experience by applying a visual overlay to the location of the physical object; and
   presenting, by the augmented-reality-computing device, the augmented reality experience with the modified one or more acoustic features and the analogous visual object.

12. The system as recited in claim 11, further storing instructions thereon that, when executed by the at least one processor, cause the system to:
   map the physical environment to determine a location of the physical object relative to the augmented-reality-computing device wherein the augmented-reality-computing device comprises a mixed reality headset; and
   modify the one or more acoustic features of the sound for the augmented reality experience by modifying the sound to simulate the sound originating from the location of the physical object relative to the augmented-reality-computing device.

13. The system as recited in claim 11, further storing instructions thereon that, when executed by the at least one processor, cause the system to modify the one or more acoustic features of the sound for the augmented reality experience by performing one or more of:
   modifying an acoustic feature of the sound for the augmented reality experience based on a distance between the location of the physical object and the augmented-reality-computing device;
   modifying the acoustic feature of the sound for the augmented reality experience based on spectral localization cues from the location of the physical object relative to the augmented-reality-computing device; or
   modifying the acoustic feature of the sound for the augmented reality experience based on a visual characteristic of the physical object.

14. The system as recited in claim 11, further storing instructions thereon that, when executed by the at least one processor, cause the system to modify the one or more acoustic features of the sound for the augmented reality experience by performing one or more of:

modifying one or more audio streams corresponding to the sound for the augmented reality experience; or consolidating two or more audio streams corresponding to the sound for the augmented reality experience.

15. The system as recited in claim 11, further storing instructions thereon that, when executed by the at least one processor, cause the system to modify the one or more acoustic features of the sound for the augmented reality experience by:

identifying a sound profile associated with the analogous virtual object; and modifying an acoustic feature of the sound based on the sound profile associated with the analogous virtual object.

16. A non-transitory computer-readable medium storing instructions thereon that, when executed by at least one processor, cause the at least one processor to:

capture a data stream corresponding to a physical environment utilizing an augmented-reality-computing device;

identify that a physical object within the physical environment that corresponds to an analogous virtual object of an augmented reality experience;

analyze the analogous virtual object within the augmented reality experience to determine a function of one or more acoustic features of the analogous virtual object;

modifying, by the augmented-reality-computing device, one or more acoustic features of a sound for the augmented reality experience based on the function of one or more acoustic features of the analogous virtual object to simulate that the sound for the augmented reality experience originates from a location of the physical object;

modifying, by the augmented-reality-computing device, one or more visual features of the augmented reality experience by applying a visual overlay to the location of the physical object; and presenting, by the augmented-reality-computing device, the augmented reality experience with the modified one or more acoustic features and the analogous visual object.

17. The non-transitory computer-readable medium as recited in claim 16, further storing instructions thereon that, when executed by the at least one processor, cause the at least one processor to:

identify a visual characteristic of the analogous virtual object;

generate a virtual graphic overlay based on the visual characteristic; and present the augmented reality experience by superimposing the virtual graphic overlay over a portion of the physical object or over an entirety of the physical object.

18. The non-transitory computer-readable medium as recited in claim 17, further storing instructions thereon that, when executed by the at least one processor, cause the at least one processor to:

detect a user interaction with an area of the physical object on which the virtual graphic overlay is superimposed;

generate a new virtual graphic overlay based on the user interaction; and render the new virtual graphic overlay superimposed over the portion of the physical object or over the entirety of the physical object.

19. The non-transitory computer-readable medium as recited in claim 16, further storing instructions thereon that, when executed by the at least one processor, cause the at least one processor to:

identify that the sound for the augmented reality experience corresponds to an additional virtual object from the augmented reality experience, wherein the augmented-reality-computing device comprises a mixed reality headset;

identify a sound effect for the sound based on the analogous virtual object;

determine a physical characteristic of the physical object; and modify the one or more acoustic features of the sound for the augmented reality experience to simulate the sound effect based on the physical characteristic of the physical object.

20. The non-transitory computer-readable medium as recited in claim 19, further storing instructions thereon that, when executed by the at least one processor, cause the at least one processor to further determine the physical characteristic of the physical object by determining that the physical object displays one or more images or produces audio.

* * * * *